(12) United States Patent
Barrett

(10) Patent No.: US 12,281,737 B2
(45) Date of Patent: Apr. 22, 2025

(54) SYSTEM FOR CORD OR CABLE ORGANIZATION

(71) Applicant: Nicholas Barrett, Naples, FL (US)

(72) Inventor: Nicholas Barrett, Naples, FL (US)

( * ) Notice: Subject to any disclaimer, the term of this patent is extended or adjusted under 35 U.S.C. 154(b) by 0 days.

(21) Appl. No.: 18/465,082

(22) Filed: Sep. 11, 2023

(65) Prior Publication Data

US 2023/0417345 A1    Dec. 28, 2023

Related U.S. Application Data

(63) Continuation of application No. 17/877,961, filed on Jul. 31, 2022, now abandoned.

(60) Provisional application No. 63/227,507, filed on Jul. 30, 2021.

(51) Int. Cl.
*F16L 3/22* (2006.01)
*F16L 3/223* (2006.01)

(52) U.S. Cl.
CPC ............. *F16L 3/223* (2013.01); *F16L 3/2235* (2013.01)

(58) Field of Classification Search
CPC . F16L 3/223; F16L 3/2235; F16L 3/22; F16L 3/237; F16L 3/1091; B63B 59/02; B63B 21/045; H02G 7/12; A61M 39/00; A61M 2209/082
USPC .................................................. 248/49, 68.1
See application file for complete search history.

(56) References Cited

U.S. PATENT DOCUMENTS

| | | | |
|---|---|---|---|
| 161,058 A | 3/1875 | Pidgeon | |
| 4,769,876 A | 9/1988 | Platt | |
| 5,316,246 A * | 5/1994 | Scott | F16L 3/223 248/90 |
| 6,012,940 A * | 1/2000 | Wheeler | H01R 13/6392 439/369 |
| 6,238,235 B1 | 5/2001 | Shavit | |
| 6,360,051 B1 | 3/2002 | Daoud | |
| D488,054 S | 4/2004 | Myers | |
| H2203 H | 10/2007 | Borchardt | |
| D568,723 S | 5/2008 | Morgan | |
| 7,394,963 B2 | 7/2008 | Hartlef | |

(Continued)

FOREIGN PATENT DOCUMENTS

WO    WO2012135075 A1    10/2012

OTHER PUBLICATIONS

U.S. Appl. No. 10/309,553, filed Jun. 4, 2019, Blaine A. Schwalbe.

(Continued)

*Primary Examiner* — Nkeisha Smith

(74) *Attorney, Agent, or Firm* — ASLAN LAW, P.C.

(57) ABSTRACT

An organizer, intended for use in managing mobile device cables, has a main body that is optionally made of elastomeric material. The main body optionally contains a weight in a weight cavity. The main body is flexible. The main body has end channels and, in many versions, cable channels. The cable channels have a smaller cross section than the end channels. In some versions, the end channels or the cable channels have triangular cutaways that make it easier for the user to push cables or the like into the channels. In one version, the top and bottom surfaces at the end angle upward and downward with respect to the top and bottom main body surfaces. In some versions, the grips flare inward and form a notch to help retain things within the end channel while making it easy to remove when desired.

26 Claims, 39 Drawing Sheets

(56) References Cited

U.S. PATENT DOCUMENTS

| | | |
|---|---|---|
| D612,225 S | 3/2010 | Forte |
| D638,690 S | 5/2011 | Hoek |
| D638,691 S | 5/2011 | Hoek |
| D638,692 S | 5/2011 | Hoek |
| D639,145 S | 6/2011 | Hoek |
| D639,146 S | 6/2011 | Hoek |
| D640,527 S | 6/2011 | Hoek |
| D644,501 S | 9/2011 | Chen |
| 8,020,259 B2 * | 9/2011 | Ho .................... F16L 3/222 24/339 |
| D657,869 S | 4/2012 | Mammen |
| 8,294,030 B2 | 10/2012 | Pollard, Jr. |
| 8,342,459 B2 | 1/2013 | Garrison |
| D691,875 S | 10/2013 | Ganski |
| D691,878 S * | 10/2013 | Ganski .................... D8/356 |
| 8,853,532 B2 | 10/2014 | Eshima |
| D720,606 S | 1/2015 | Mathews |
| 8,998,151 B2 | 4/2015 | Hoek |
| D728,349 S | 5/2015 | Lake |
| D732,935 S | 6/2015 | Egami |
| D743,048 S | 11/2015 | Kuran |
| D749,209 S | 2/2016 | Uhlenkamp |
| D755,043 S | 5/2016 | Bailey |
| D774,002 S | 12/2016 | Hsieh |
| 9,575,278 B2 | 2/2017 | Leclerc |
| 9,618,143 B2 | 4/2017 | Noble |
| D790,127 S | 6/2017 | Verleur |
| 9,783,124 B2 | 10/2017 | Catlin |
| D803,164 S | 11/2017 | Noble |
| 9,853,436 B2 | 12/2017 | Simon |
| D826,164 S | 8/2018 | Mastel |
| D835,497 S | 12/2018 | Rindy et al. |
| 10,300,248 B2 | 5/2019 | Taylor |
| D852,354 S | 6/2019 | Wrangmark |
| D853,336 S | 7/2019 | Barram |
| D858,457 S | 9/2019 | Maggard |
| D866,480 S | 11/2019 | Hoshikawa |
| D886,991 S | 6/2020 | Kindler |
| D886,992 S | 6/2020 | Kindler |
| D907,988 S | 1/2021 | Yu |
| D909,188 S | 2/2021 | Kou |
| D910,572 S | 2/2021 | Yang |
| D928,311 S | 8/2021 | McVaney |
| 11,095,104 B2 * | 8/2021 | Frierson ............... H02G 3/0431 |
| D930,459 S | 9/2021 | Breines |
| D941,251 S | 1/2022 | Wu |
| D944,629 S | 3/2022 | Barrett |
| D969,311 S | 11/2022 | Jansson |
| D1,000,609 S | 10/2023 | Jansson |
| D1,000,610 S | 10/2023 | Jansson |
| D1,008,003 S | 12/2023 | Glickfield |
| D1,016,756 S | 3/2024 | Steussloff |
| D1,025,755 S | 5/2024 | Barrett |
| 12,013,063 B2 | 6/2024 | Barrett |
| 2001/0035295 A1 | 11/2001 | Cipollone |
| 2005/0173597 A1* | 8/2005 | Farrell .................... F16L 3/223 248/68.1 |
| 2005/0189453 A1 | 9/2005 | DeGuevara |
| 2007/0235597 A1* | 10/2007 | Winchester .............. F16L 3/223 248/68.1 |
| 2009/0065249 A1* | 3/2009 | Silvers .................... H02G 3/305 174/72 A |
| 2010/0132979 A1 | 6/2010 | Chen |
| 2011/0147542 A1 | 6/2011 | Hoek |
| 2020/0080664 A1 | 3/2020 | Perry |
| 2020/0313411 A1 | 10/2020 | Williams |
| 2021/0116053 A1 | 4/2021 | Lindmark |
| 2023/0012185 A1 | 1/2023 | Meng |
| 2023/0417345 A1 | 12/2023 | Barrett |

OTHER PUBLICATIONS

U.S. Appl. No. 11/134,775, filed Oct. 5, 2021, Nicole Marie Weikert.

* cited by examiner

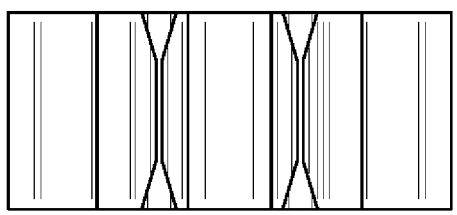
FIG. 12A
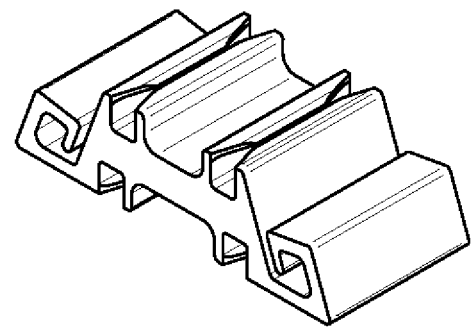
FIG. 12E
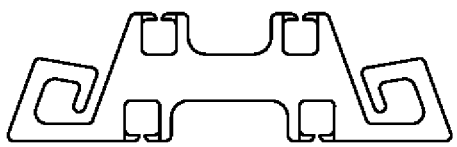
FIG. 12B
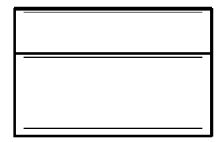
FIG. 12F
FIG. 12C
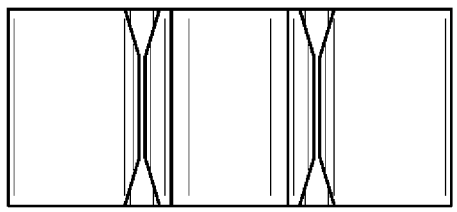
FIG. 12G
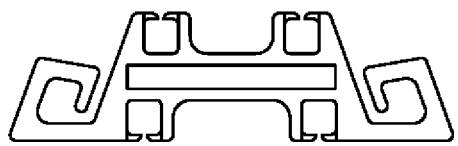
FIG. 12D
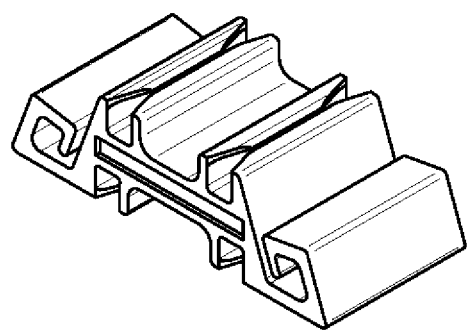

FIG. 16D
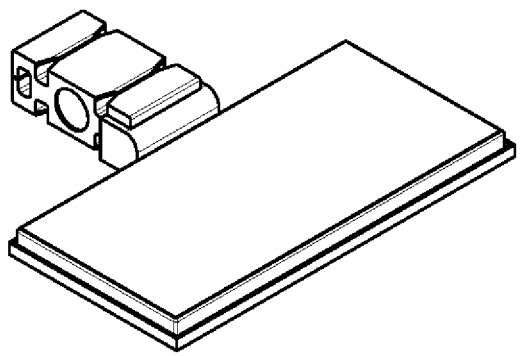
FIG. 16A
FIG. 16B
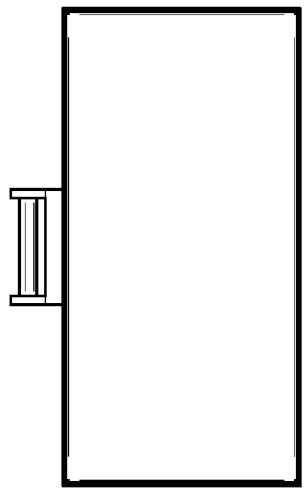
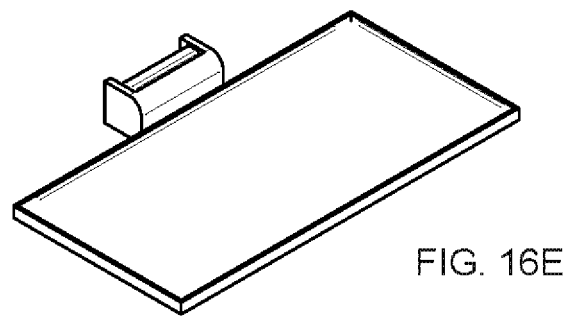
FIG. 16E
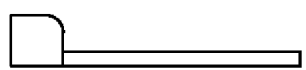
FIG. 16C
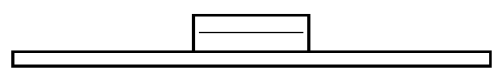
FIG. 16F
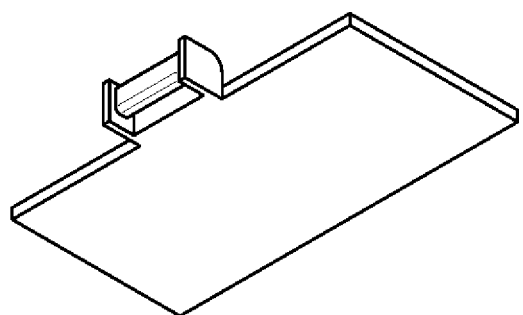
FIG. 16G

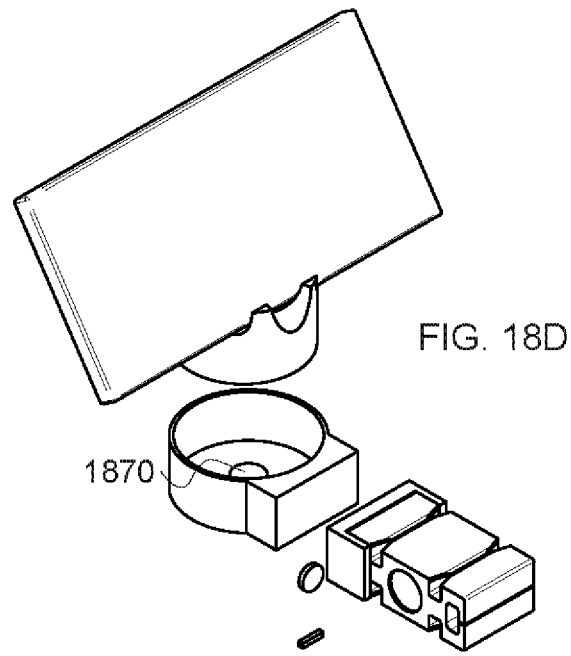
FIG. 18D
FIG. 18E
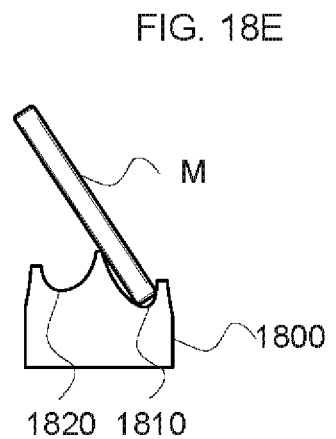
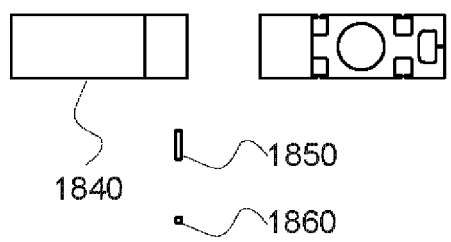
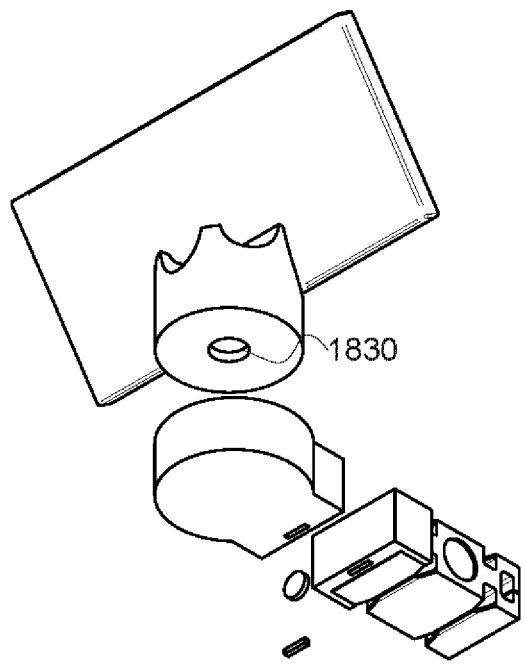
FIG. 18F

2200

2250  2220
2215 2220
2210
2210
2210
2240  2230

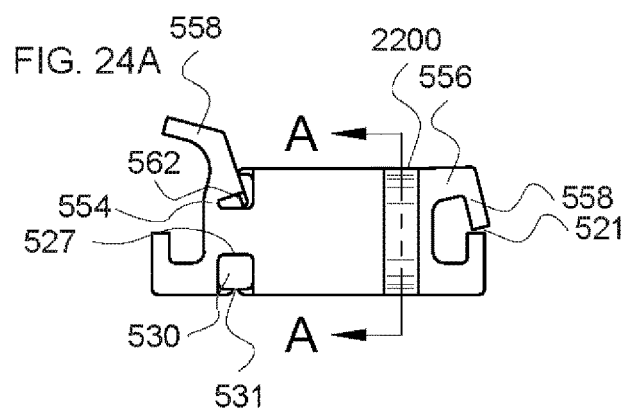
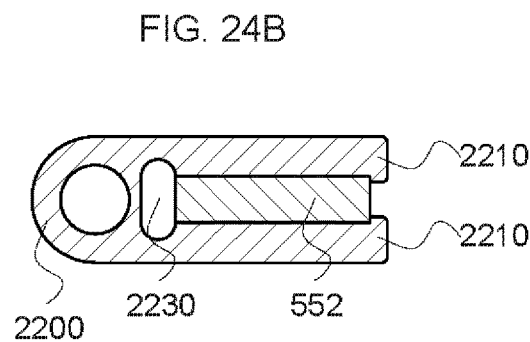
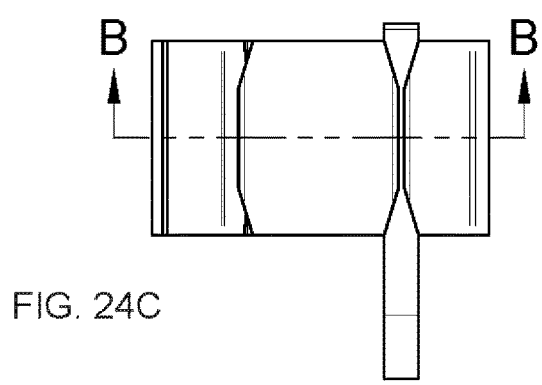
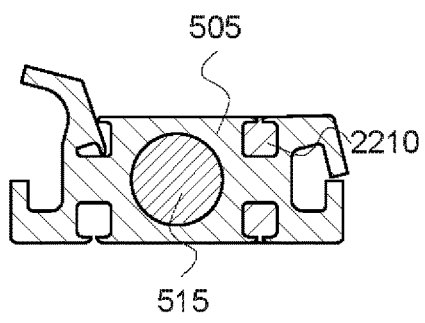
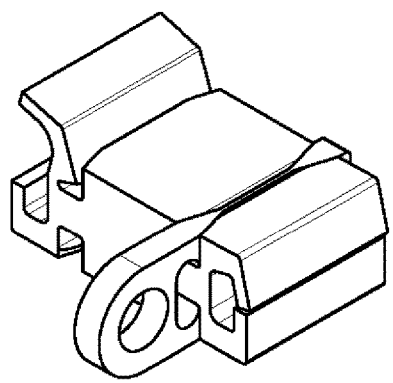
FIG. 24A
FIG. 24B
FIG. 24C
FIG. 24D
FIG. 24E

US 12,281,737 B2

SYSTEM FOR CORD OR CABLE ORGANIZATION

CROSS-REFERENCE TO RELATED APPLICATIONS

This application is a continuation of U.S. patent application Ser. No. 17/877,961 filed Jul. 31, 2022 (the '961 application), which claims the benefit of U.S. Provisional Patent Application 63/227,507 filed Jul. 30, 2021, all of which are incorporated herein, in their entireties, by this reference. This application is related to United States Design Patent Application 29/881,114 filed Dec. 28, 2022, which is also a continuation of the '961 application.

BACKGROUND

Mobile device cords, such as charging cords, annoy their users by not staying in place when users unplug them from their devices. Computer cords, such as power cords and network cables, do the same when unplugged from a laptop or tablet. Various cord organizers have features that help cut down on this annoyance a little, but no organizer has yet shown that it is what consumers really want. Consumers want a solution that not only organizes cords but also offers additional capabilities or features that make it useful to bring along.

For example, consider U.S. Pat. No. 8,998,151 to Hoek (D1 hereafter). This "cord organizer" offers three to five cable channels across the top of its body (see FIG. 1A) The body is highly flexible (see FIG. 1B). The bottom of the body is flat, equipped with striations to resist sliding or with adhesive to prevent movement. This type of organizer can keep some cables in place under some conditions, but its mass is fairly low. This makes it likely to tip over, flop around, tip on its side, or slide off the edge of a desk or table when the weight of the slack part of the cord bears upon it. Using an adhesive to affix the D1 organizer to a surface overcomes this issue at the cost of mobility. Any adhesive, however, may leave residue on the surface as well. Also, the D1 organizer offers no feature, beyond holding cords, that would make it useful enough for a user to want to bring it with them.

Consider U.S. Pat. No. 9,783,124 to Catlin (D2 hereafter). This device organizes one cord for a mobile device when installed in a vehicle. The D2 organizer offers a mobile device holder feature in addition to organizing the one cord. Besides being limited to organizing only one cord, the D2 organizer suffers from two further limitations: it is substantially larger than the mobile device and it remains permanently installed by fasteners within the vehicle's console. A user cannot put the D2 organizer in their briefcase, pocket, or purse nor can a user take advantage of the organizing features on their bedside stand or kitchen counter.

SUMMARY

This summary introduces a selection of high-level concepts, in simplified form, which are further described below in the detailed description. This summary is not intended to identify any essential features of the claimed subject matter.

Below, various embodiments (although not necessarily all) feature a main body of elastomeric material and a weight held inside a weight cavity that is in the main body.

Most embodiments provide end channels on the left and right sides of the main body, and these are intended for use in various helpful ways such as retaining cords, retaining the connectors at the ends of cords, connecting to attachments, or supporting mobile devices.

Many embodiments provide cable channels that are often smaller than the end channels, and these are intended for use in retaining cords and connecting to attachments.

Numerous different variations show how the inventive concepts find liberal application with laudable diversity in shape and arrangement.

BRIEF DESCRIPTION OF THE DRAWINGS

The drawings are included to provide a better understanding of the description below and constitute a part of this specification. The drawings illustrate example implementations of the disclosure and, with the description, explain the principles of the disclosure.

FIG. 12A shows a plan view of a cord organizer according to yet another embodiment.

FIG. 12B shows the cord organizer of FIG. 12A from a front side elevation view.

FIG. 12C shows a bottom view of the cord organizer of FIG. 12A.

FIG. 12 D shows the cord organizer of FIG. 12A from a rear side elevation view.

FIG. 12E shows the cord organizer of FIG. 12A from a front side perspective view.

FIG. 12F shows the cord organizer of FIG. 12A from a left- or right-side elevation view.

FIG. 12 G shows the cord organizer of FIG. 12A from a rear side perspective view.

FIG. 16A is an elevation view of a cord organizer assembled together with a mobile device holder that has an end channel attachment and a mobile device thereon.

FIG. 16B is a plan view of the mobile device holder that has an end channel attachment as in FIG. 16A.

FIG. 16C is a right or left side elevation view of the mobile device holder in FIG. 16B.

FIG. 16D is a rear perspective view of the cord organizer, the mobile device holder, and the mobile device shown in FIG. 16A.

FIG. 16E is a perspective view of the mobile device holder of FIG. 16B.

FIG. 16F is a front side elevation view of the mobile device holder of FIG. 16B.

FIG. 16G is another perspective view of the mobile device holder of FIG. 16B.

FIG. 17A is a plan view of a cord organizer assembled together with a mobile device holder that has an end channel attachment, according to another embodiment.

FIG. 17B is a rear elevation view of the assembly shown in FIG. 17A.

FIG. 17C is an elevation view of the mobile device holder that has an end channel attachment from FIG. 17A.

FIG. 17D is a rear perspective view of the assembly shown in FIG. 17A.

FIG. 17E is another perspective view of the assembly shown in FIG. 17A.

FIG. 18A shows a perspective view of an embodiment of a rotating mobile device holder assembled together with a cord organizer.

FIG. 18B shows a rear side elevation view of the assembly of FIG. 18A.

FIG. 18C shows another perspective view of the assembly of FIG. 18A

FIG. 18D shows an exploded view of the assembly of FIG. 18A.

FIG. 18E shows an exploded view of the assembly of FIG. 18B.

FIG. 18F shows an exploded view of the assembly of FIG. 18C.

FIG. 19A shows a plan view of an embodiment of an accessory box assembled together with a cord organizer.

Figure 19A:
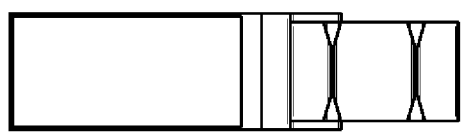
Figure 19D:
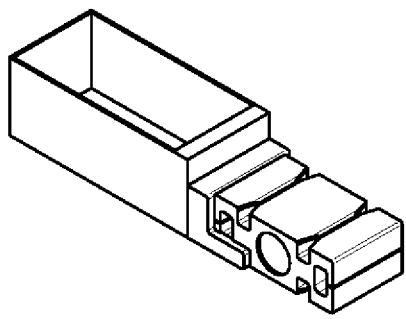
Figure 19B:
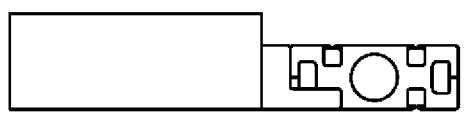

FIG. 19B shows a rear side elevation view of the assembly of FIG. 19A.

Figure 19E:
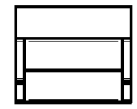
Figure 19C:
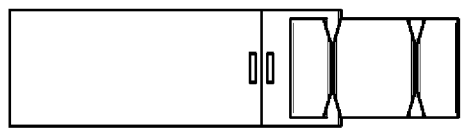

FIG. 19C shows a bottom view of the assembly of FIG. 19A.

FIG. 19D shows a rear perspective view of the assembly of FIG. 19A.

FIG. 19E shows a left side elevation view of the assembly of FIG. 19A.

Figure 19F:
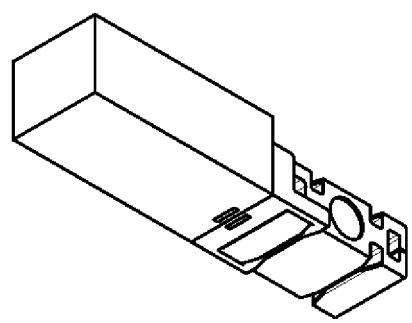

FIG. 19F shows another perspective view of the assembly of FIG. 19A.

Figure 20A:
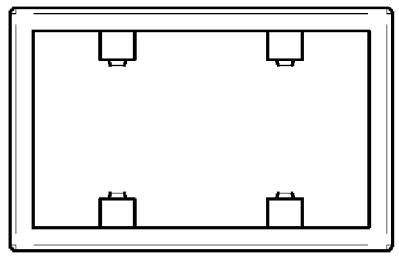

FIG. 20A shows a plan view of a holder for a cord organizer.

Figure 20D:
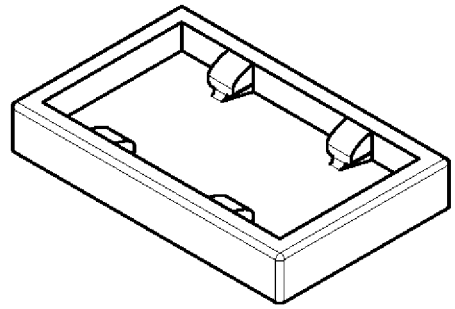
Figure 20B:

FIG. 20B shows a front side elevation view of the holder in FIG. 20A.

Figure 20E:
Figure 20C:

FIG. 20c shows a bottom view of the holder in FIG. 20A.

FIG. 20D shows a top perspective view of the holder in FIG. 20A.

FIG. 20E shows a left- or right-side elevation view of the holder in FIG. 20A.

Figure 20F:
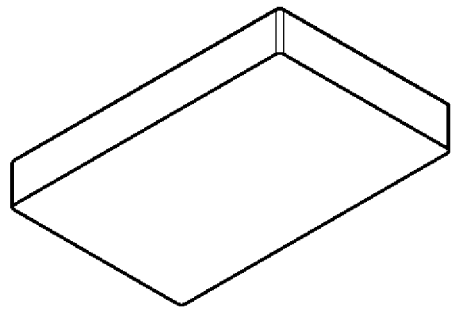

FIG. 20F shows a bottom perspective view of the holder in FIG. 20A.

Figure 21A:
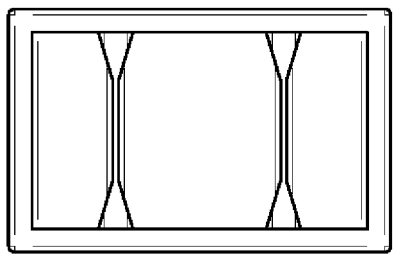

FIG. 21A shows a plan view of the holder in FIG. 20A assembled together with a cord organizer.

Figure 21D:
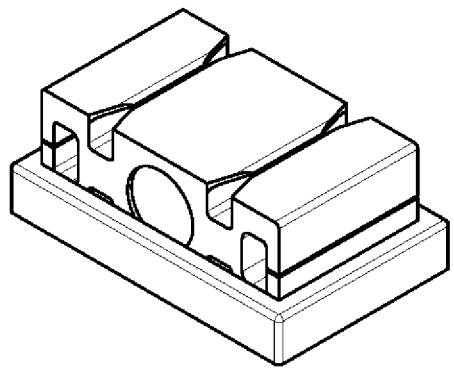
Figure 21B:
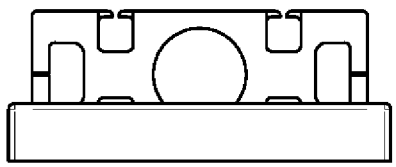

FIG. 21B shows an elevation view of the rear of an cord organizer when assembled together with the holder in FIG. 20A.

Figure 21E:
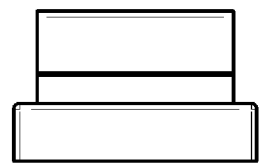
Figure 21C:

FIG. 21C shows a bottom view of the assembly of FIG. 21A.

FIG. 21D shows a top perspective view of the assembly of FIG. 21A.

FIG. 21E shows a left or right elevation view of the assembly of FIG. 21A.

Figure 21F:
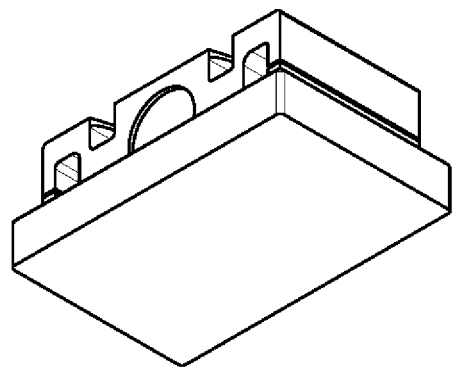

FIG. 21F shows a bottom perspective view of the assembly of FIG. 21A.

Figures 22A, 22D:
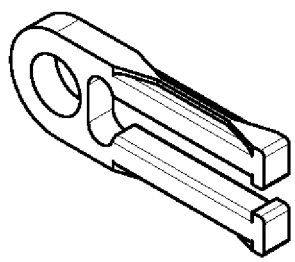

FIG. 22A shows a perspective view of a cable channel keyring retainer according to an embodiment.

Figure 22B:

FIG. 22B shows a side elevation view of the retainer of FIG. 22A.

Figure 22C:
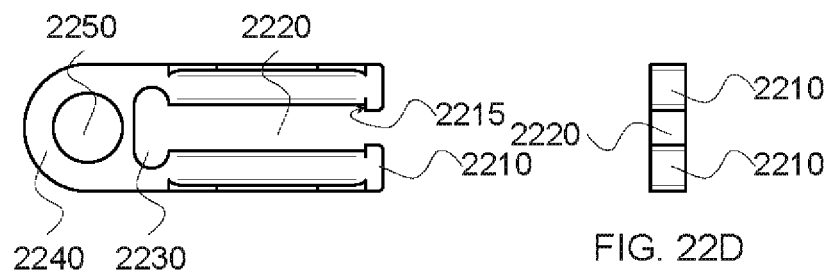

FIG. 22C shows a plan view of the retainer of FIG. 22A.

FIG. 22D shows an end elevation view of the retainer of FIG. 22A.

Figure 22E:
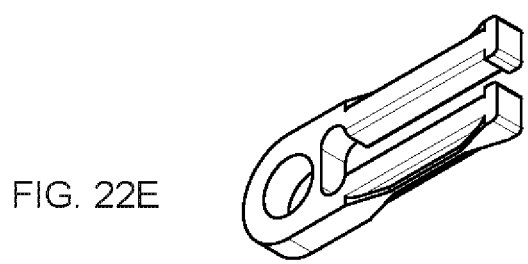

FIG. 22E shows another perspective view of the retainer of FIG. 22A.

Figure 23A:
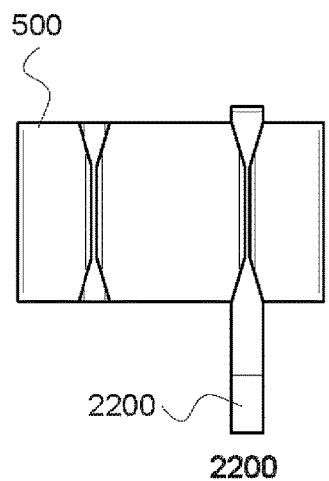

FIG. 23A shows a plan view of the cable channel keyring retainer of FIG. 22A assembled together with a cord organizer.

Figure 23B:
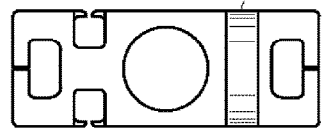

FIG. 23B shows a rear side elevation view of the assembly of FIG. 23A.

Figure 23C:
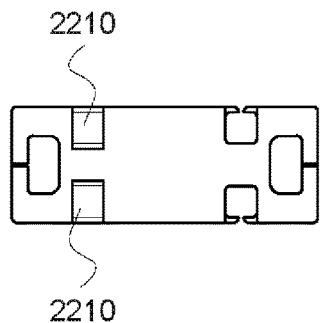

FIG. 23C shows a front side elevation view of the assembly of FIG. 23A.

Figure 23D:
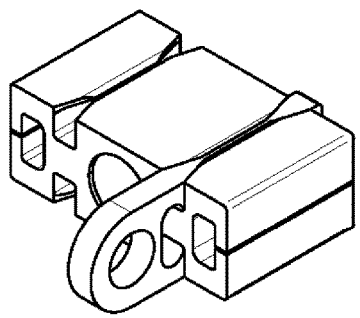

FIG. 23D shows a rear side perspective view of the assembly of FIG. 23A.

Figure 23E:
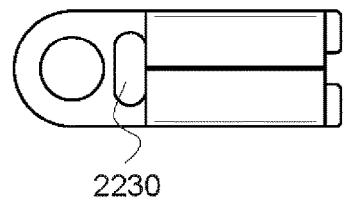

FIG. 23E shows a left- or right-side elevation view of the assembly of FIG. 23A.

Figure 23F:
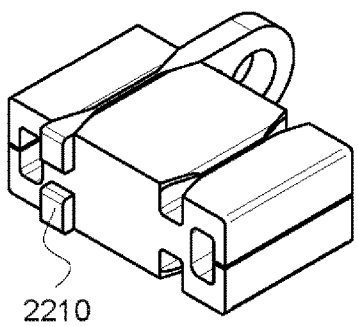

FIG. 23F shows a front side perspective view of the assembly of FIG. 23A.

FIG. 24A shows the assembly of FIG. 23A from a front side elevation view with the upper left and upper right arms opened.

FIG. 24B shows a cross-sectional view of the assembly in FIG. 24A along line A-A.

FIG. 24C shows the assembly of FIG. 24A in a plan view.

FIG. 24D shows a cross-sectional view of the assembly in FIG. 24C along line B-B.

FIG. 24E shows a front perspective view of the assembly of FIG. 24A.

Figure 25A:
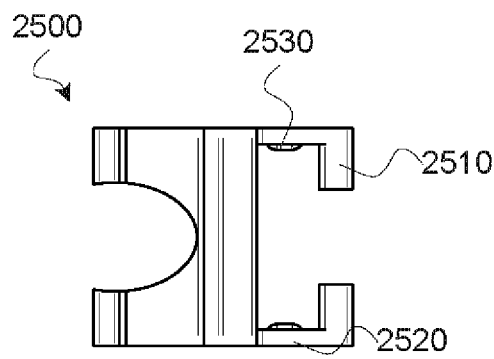

FIG. 25A shows a plan view of a mobile device holder with a cable channel attachment feature.

Figure 25E:
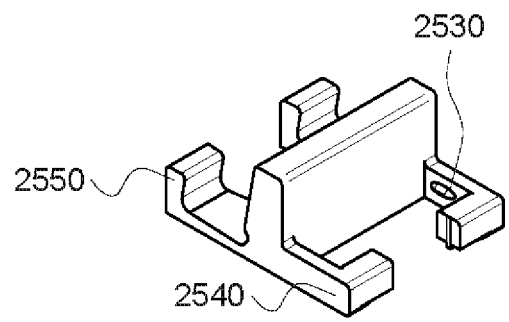
Figure 25B:

FIG. 25B shows a right side elevation view of the holder of FIG. 25A.

Figure 25F:
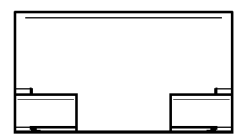
Figure 25C:

FIG. 25C shows a left side elevation view of the holder of FIG. 25A.

Figure 25G:
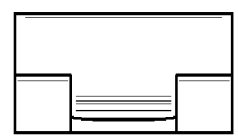
Figure 25D:
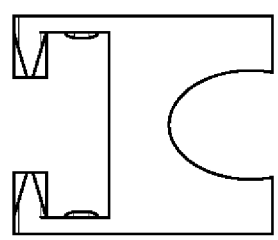

FIG. 25D shows a bottom view of the holder of FIG. 25A.

FIG. 25E shows a rear perspective view of the holder of FIG. 25A.

FIG. 25F shows a rear elevation view of the holder of FIG. 25A.

FIG. 25G shows a front elevation view of the holder of FIG. 25A.

Figure 25H:
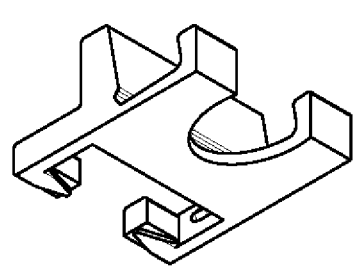

FIG. 25H shows a front perspective view of the holder of FIG. 25A.

Figure 26A:
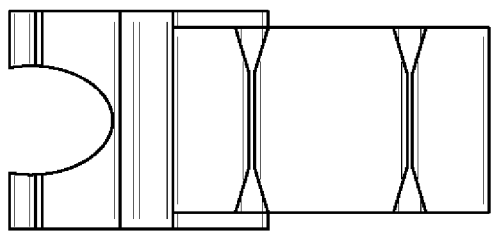

FIG. 26A shows a plan view of the holder of FIG. 25A assembled together with a cord organizer.

Figure 26E:
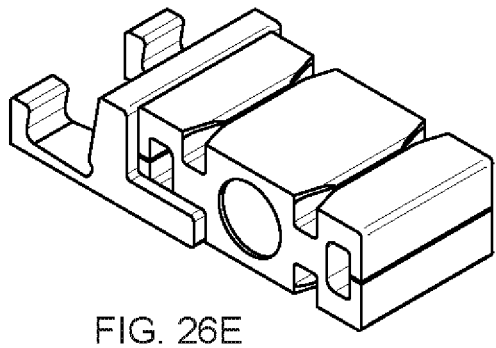
Figure 26B:
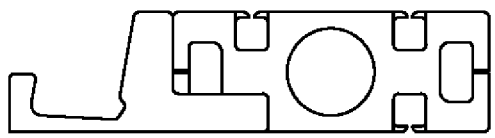

FIG. 26B shows a rear side elevation view of the assembly of FIG. 26A.

Figure 26F:
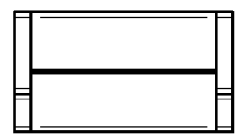
Figure 26C:
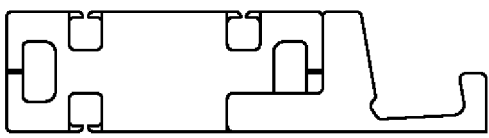

FIG. 26C shows a front side elevation view of the assembly of FIG. 26A.

Figure 26G:
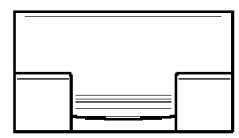
Figure 26D:
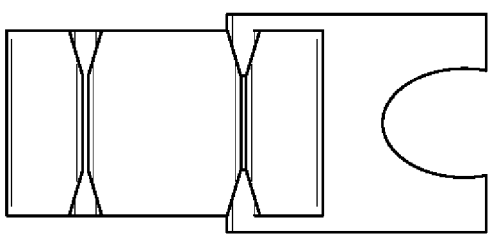

FIG. 26D shows a bottom view of the assembly of FIG. 26A.

FIG. 26E shows a rear perspective view of the assembly of FIG. 26A.

FIG. 26F shows a left side elevation view of the assembly of FIG. 26A.

FIG. 26G shows a right side elevation view of the assembly of FIG. 26A.

Figure 26H:
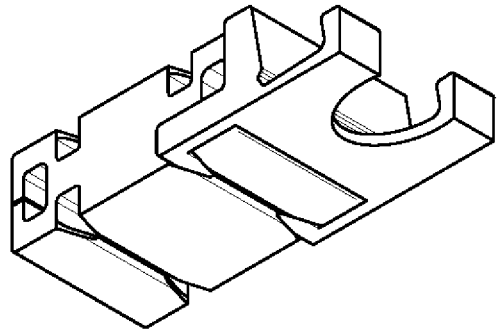

FIG. 26H shows a front perspective view of the assembly of FIG. 26A.

Figure 27A:
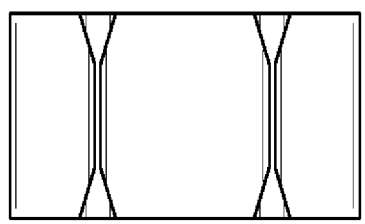

FIG. 27A shows a plan view of a cord organizer according to yet another embodiment.

Figure 27E:
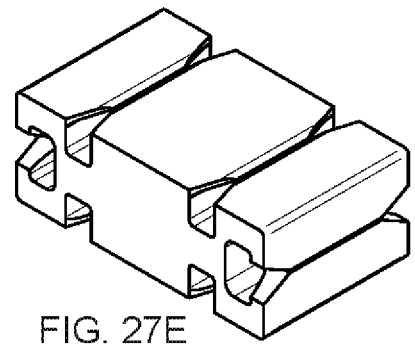
Figure 27B:
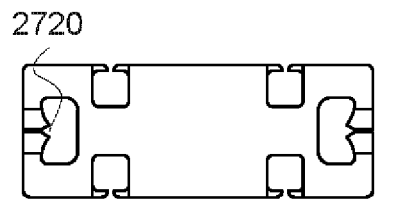

FIG. 27B shows a front side elevation view of the cord organizer of FIG. 27A.

Figure 27F:
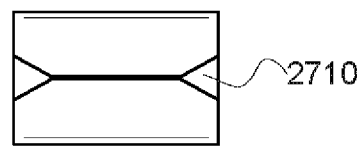
Figure 27C:
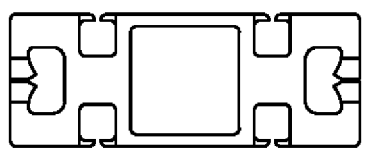

FIG. 27C shows a rear side elevation view of the cord organizer of FIG. 27A.

Figure 27G:
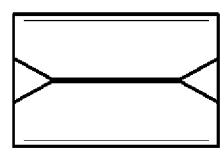
Figure 27D:
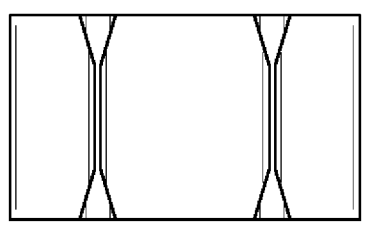

FIG. 27D shows a bottom view of the cord organizer of FIG. 27A.

FIG. 27E shows a front perspective view of the cord organizer of FIG. 27A.

FIG. 27F shows a right side elevation view of the cord organizer of FIG. 27A.

FIG. 27G shows a left side elevation view of the cord organizer of FIG. 27A.

Figure 27H:
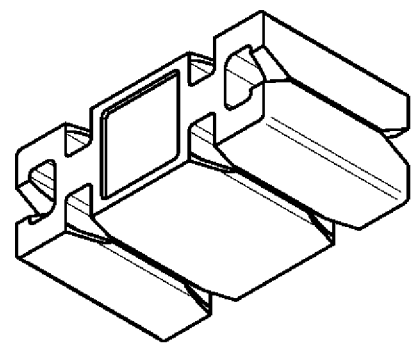

FIG. 27H shows a rear perspective view of the cord organizer of FIG. 27A.

Figure 28A:
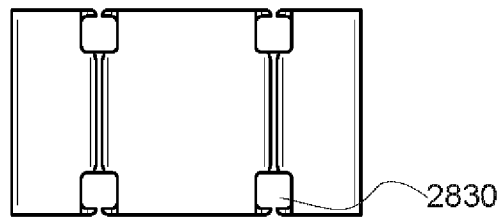

FIG. 28A shows a plan view of a cord organizer according to yet another embodiment.

Figure 28B:
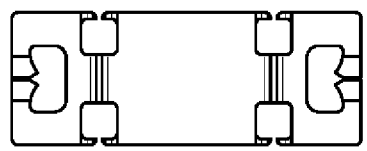

FIG. 28B shows a front side elevation view of the cord organizer of FIG. 28A.

Figure 28C:
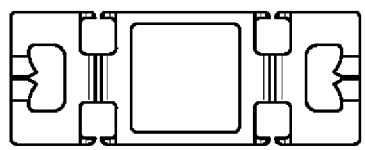

FIG. 28C shows a rear side elevation view of the cord organizer of FIG. 28A.

Figure 28D:
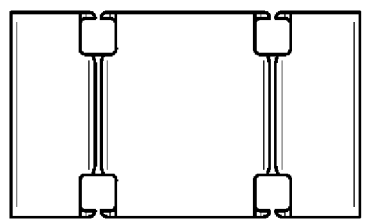

FIG. 28D shows a bottom view of the cord organizer of FIG. 28A.

Figure 28E:
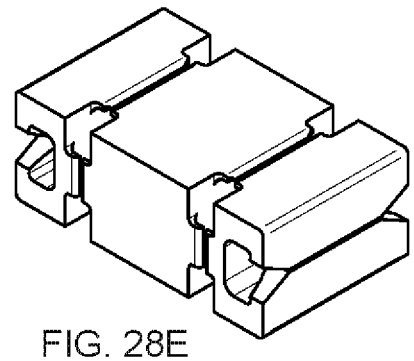

FIG. 28E shows a front perspective view of the cord organizer of FIG. 28A.

Figure 28F:
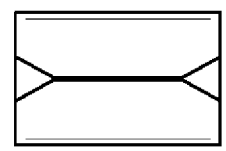

FIG. 28F shows a right side elevation view of the cord organizer of FIG. 28A.

Figure 28G:
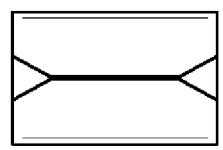

FIG. 28G shows a left side elevation view of the cord organizer of FIG. 28A.

Figure 28H:
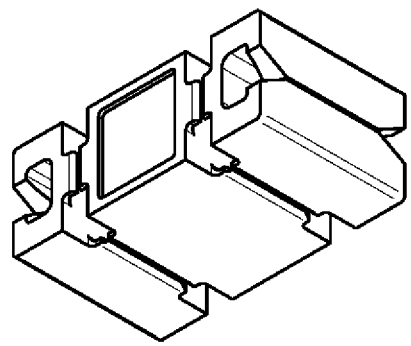

FIG. 28H shows a rear perspective view of the cord organizer of FIG. 28A.

Figure 28I:
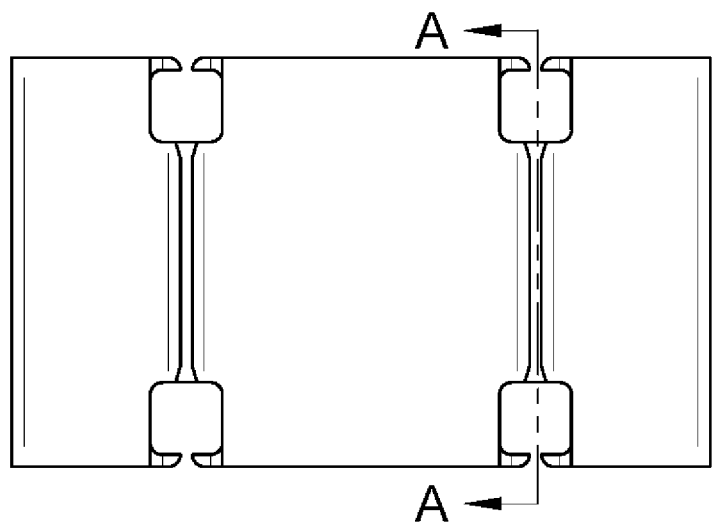

FIG. 28I shows a plan view of the cord organizer of FIG. 28A and a section line.

Figure 28J:
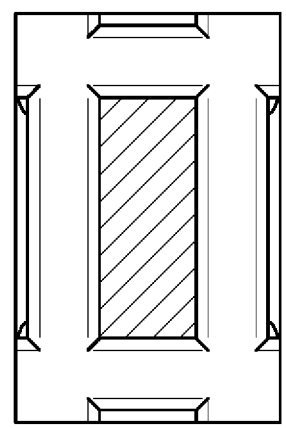

FIG. 28J shows a cross section view of the cord organizer of FIG. 28I along line A-A.

Figure 29A:
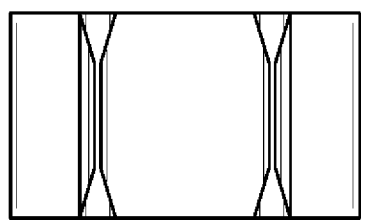

FIG. 29A shows a plan view of a cord organizer according to yet another embodiment.

Figure 29E:
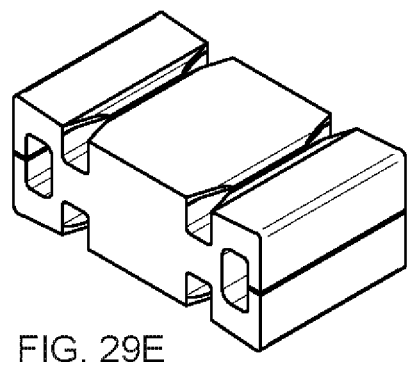
Figure 29B:
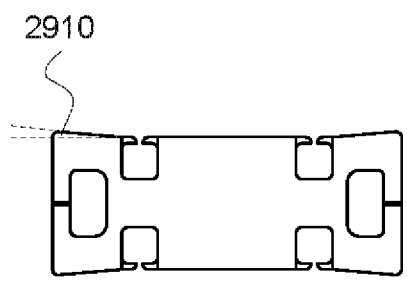

FIG. 29B shows a front side elevation view of the cord organizer of FIG. 29A.

Figure 29F:
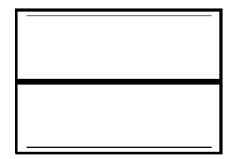
Figure 29C:
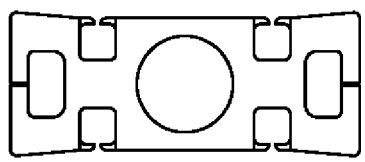

FIG. 29C shows a rear side elevation view of the cord organizer of FIG. 29A.

Figure 29G:
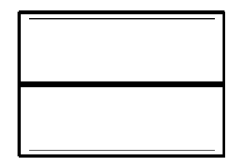
Figure 29D:
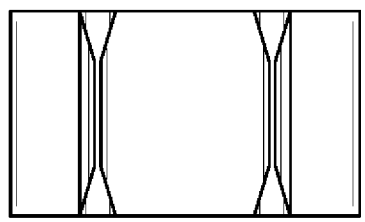

FIG. 29D shows a bottom view of the cord organizer of FIG. 29A.

FIG. 29E shows a front perspective view of the cord organizer of FIG. 29A.

FIG. 29F shows a right side elevation view of the cord organizer of FIG. 29A.

FIG. 29G shows a left side elevation view of the cord organizer of FIG. 29A.

Figure 29H:
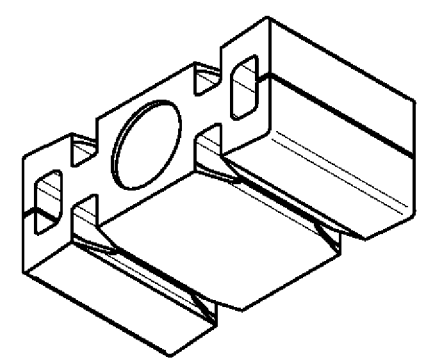

FIG. 29H shows a rear perspective view of the cord organizer of FIG. 29A.

DETAILED DESCRIPTION

This section teaches the concepts of the invention through various examples. The extent of legal protection for the invention should be viewed in the light of the appended claims.

A concrete implementation of an embodiment appears in FIGS. 3A through 3I. In this embodiment, an elongate, flexible, brick-shaped main body houses a weight. The main body's material density allows for its constituent parts to deform under force but it returns to its original shape after the force ceases. The weight's material density is relatively higher than the main body and it is inflexible. The weight gives this embodiment enough mass to stop it from being easily dragged from a surface by a typical mobile device cord. Because this embodiment has a flexible main body and a more dense, inflexible weight, the overall apparatus has easily-deformable outer parts but a substantial, stiff core that keeps its overall shape.

Figure 1A:
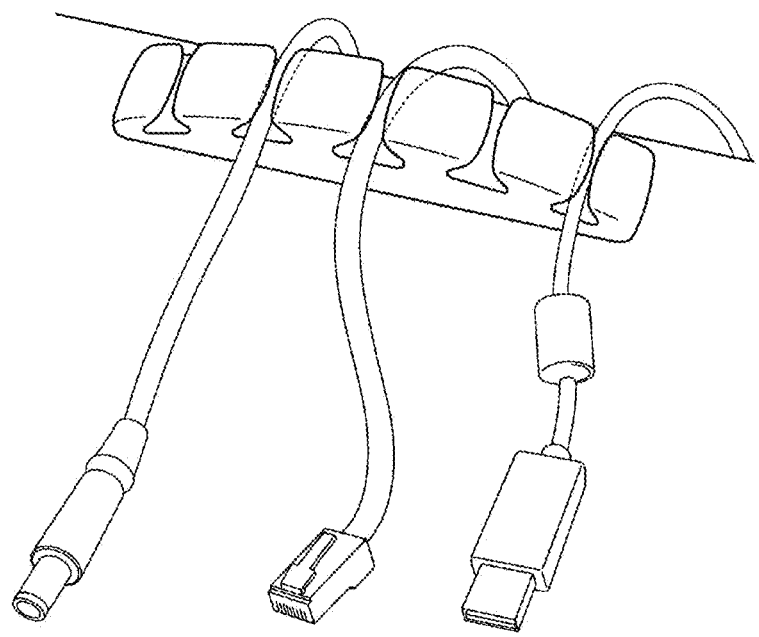
FIG. 1A is a copy of a drawing from a cord organizer in a prior art document referred to as D1, above.
Figure 1B:
FIG. 1B is a copy of another drawing from the same document D1.
Figure 2:
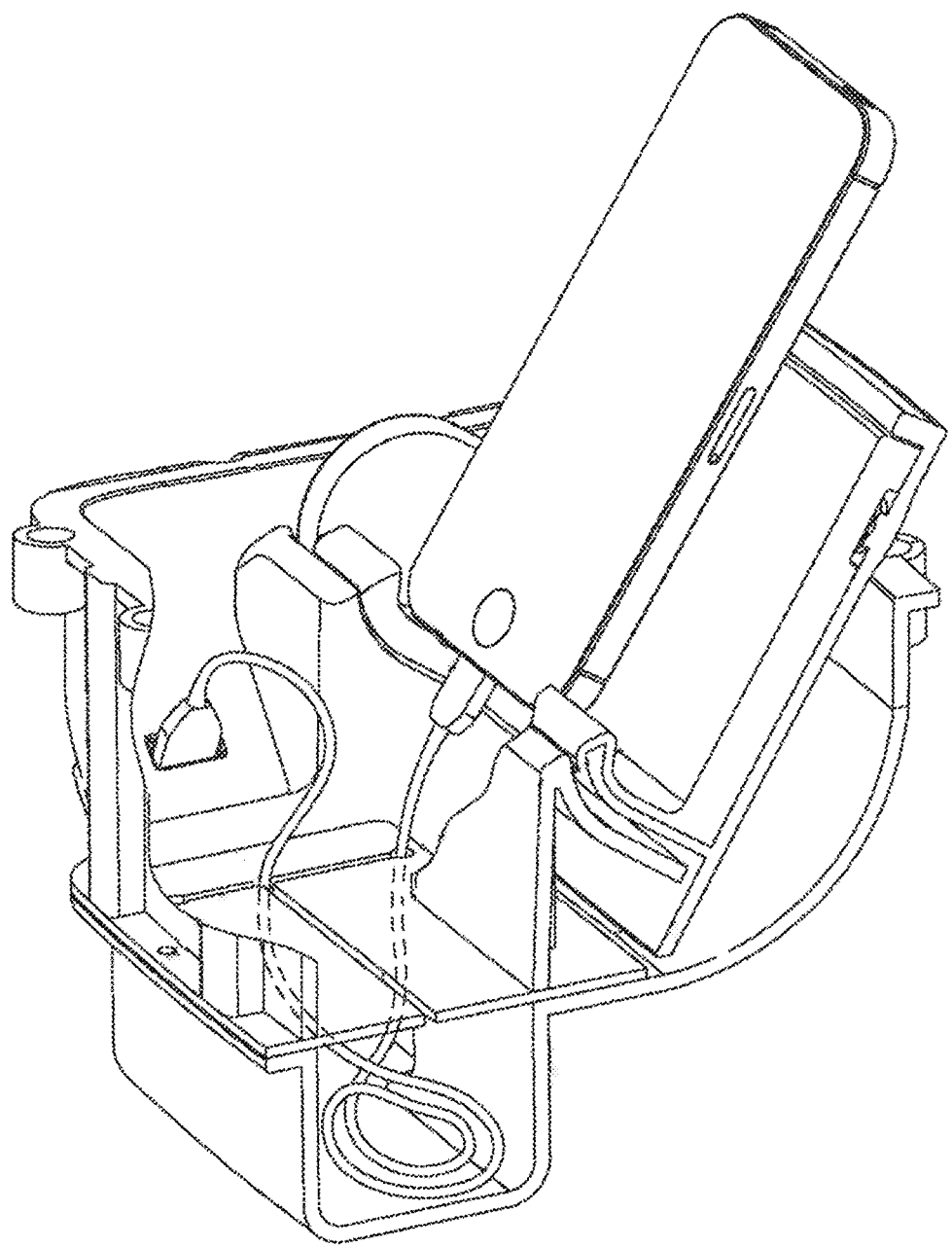
FIG. 2 is a copy of a drawing from a cord organizer in a prior art document referred to as D2, above.
Figure 3A:
FIG. 3A shows a plan view of a cord organizer according to an embodiment.
Figure 3B:
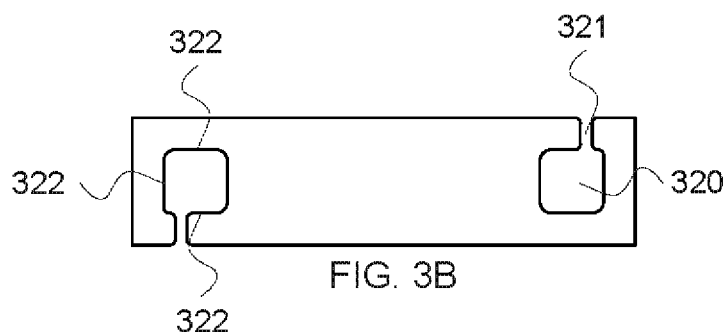
FIG. 3B shows a front side elevation view of the cord organizer shown in FIG. 3A.
Figure 3C:
FIG. 3C shows a right side elevation view of the cord organizer shown in FIG. 3A.
Figure 3D:
FIG. 3D shows a view from the bottom side of the cord organizer shown in FIG. 3A.
Figure 3E:
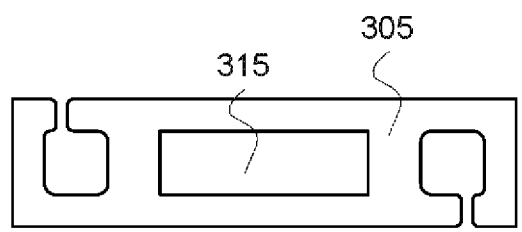
FIG. 3E shows a rear side elevation view of the cord organizer shown in FIG. 3A.
Figure 3F:
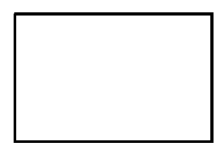
FIG. 3F shows a left side elevation view of the cord organizer shown in FIG. 3A.
Figure 3G:
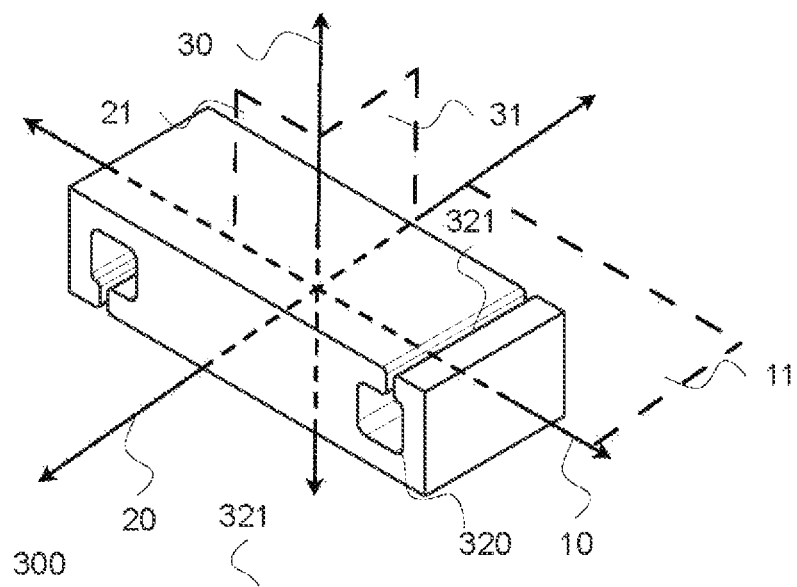
FIG. 3G shows a front side perspective view of the cord organizer shown in FIG. 3A.
Figure 3H:
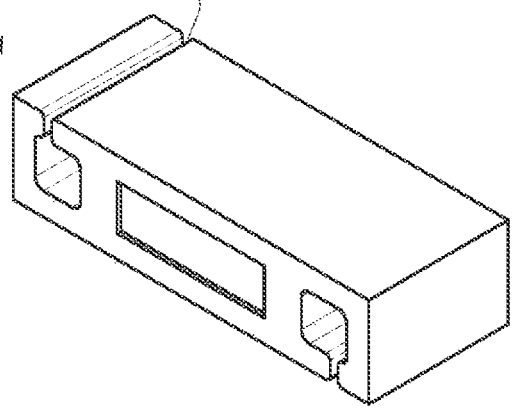
FIG. 3H shows a rear side perspective view of the cord organizer shown in FIG. 3A.
Figure 3I:
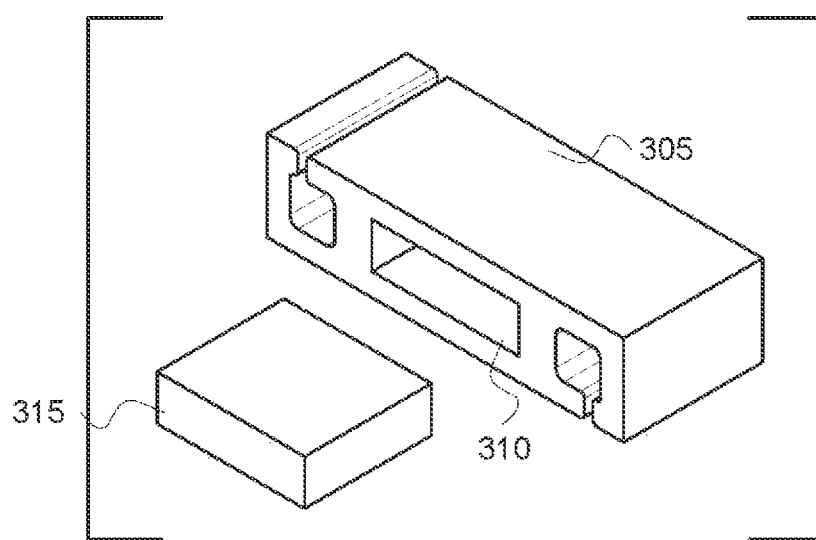
FIG. 3I shows the same cord organizer as in FIG. 3H, but in an exploded view.

FIG. 3I shows this embodiment in an exploded view. On this drawing sheet, an organizer 300 has a main body 305 and a weight 315. The main body's material is flexible and may be thought of as having a first density. The inflexible material of the weight may be thought of as having a second density. The second density exceeds the first density, allowing the weight to provide significant mass in a small amount of space. The main body has a weight cavity 310 accommodating the weight.

The weight in this embodiment and others has various shapes appropriate to the specific embodiment. In some alternative embodiments, more than one weight fits in the weight cavity. In some alternative embodiments, the main body has more than one weight cavity and the weight, split into multiple pieces, rests within the multiple weight cavities.

The main body, made of an elastomer such as natural rubber or a synthetic rubber like silicone rubber in many embodiments, has a grippy nature that provides the organizer with a high degree of friction between the outside of the organizer and the surface upon which the organizer rests. The way the material grips the surface helps resist forces that may try to urge the organizer along the surface and over any nearby edge. At least the parts of the organizer that flex and the surfaces that contact other surfaces, such as the top of a nightstand, should comprise the elastomeric material.

Making the cross section of the weight cavity just smaller than the cross section of the weight allows the weight to be retained by the main body once inserted. An adhesive can help the weight stay in place, as can providing retaining ribs around the perimeter at the edge of where the weight cavity opens to the outside of the main body.

The embodiment shown in FIGS. 3A-3I exposes an outside face of the weight. The weight may, in this embodiment and the others described hereafter, be contained entirely within the main body, thereby giving the organizer a more aesthetically pleasing look.

FIG. 3G shows a three-dimensional, Cartesian coordinate system overlaid on the organizer in which the main body has a main body length along a first axis 10, a main body width along a second axis 20 perpendicular to the first axis, and a man body height along a third axis 30 perpendicular to the first axis and to the second axis. These are the dimensions of the cord organizer. The first axis, the second axis, and the third axis intersect at a common reference point of the organizer and define the organizer's axes. In this coordinate system, the first axis 10 and the second axis 20 define a first plane 11. The first axis 10 and the third axis 30 define a second plane 21. The second axis 20 and the third axis 30 define a third plane 31. The first plane, the second plane, and the third planes define planes of the organizer.

FIG. 3G has three pair of sides, in general. A first pair of sides includes the main body front side visible in FIG. 3G in a plane parallel to the third plane 31 and a main body rear side that is behind this plane and hidden (but visible in FIG. 3H). A second pair of sides includes the main body top side visible in FIG. 3G in a plane parallel to the first plane 11 and a main body bottom side that is below the first plane and not shown in FIG. 3G. A third pair of sides include a main body left side and a main body right side on alternate sides of the second plane 21. FIG. 3G shows the main body right side and the main body left side appears in FIG. 3H. The first pair of sides, the second pair of sides, and the third pair of sides generally define the various sides of the main body.

Returning to FIG. 3G, 320 indicates an end channel communicating between the front side and the rear side, also referred to as the first pair of sides. In some embodiments, to be discussed below, the end channel communicates between the top side and the bottom side, also referred to as the second pair of sides. The end channel in the embodiment of FIGS. 3A-3I communicates from the front to the rear of the main body. Whether the end channel is between the first pair of sides or the second pair of sides, its direction of communication may be referred to in a general way as an end channel direction.

The end channel 320 has an end channel passage 321 that communicates from an interior of the end channel to outside of the main body. Referring to FIG. 3G, the end channel passage closest to the viewer communicates from the interior of end channel 320 to outside of the main body via the top side of the main body. In this embodiment, the main body has two end channels. The first end channel may be thought of as the one closest to the viewer, The other end channel may be thought of as the second end channel. The second end channel has an end channel passage that communicates from the interior to outside of the main body via the bottom side of the main body.

In the embodiment of FIGS. 3A-3I, the first end channel and the second end channel are disposed symmetrically about the common point of reference of the main body. The first end channel direction is parallel to the second end channel direction. The first end channel passage and the second end channel passage open to the outside from opposite ones of one of the pairs of sides of the main body: the first end channel passage communicates to outside of the main body via the top side and the second end channel passage communicates to outside of the main body via the bottom side.

The end channels of this embodiment share an identical cross section, namely, a square with rounded corners. Referring to FIG. 3B, the cross section of one of the end channels shows three of the four walls 322 of the square with rounded corners.

The end channel passages of this embodiment also share an identical cross section. Each end channel passage extends outward from its end channel, perpendicular to one wall 322 formed by the cross section of the end passage. In this instance, the end channel passage extends from a position that is offset from the center of that wall.

The end channel in this embodiment forms a jaw on each of the left and right sides through which a cable can be admitted. The jaw can also be flexed open to accommodate a mobile device and help hold it up. Turning the cord organizer on either its front or rear side provides a way to support the mobile device at any of a number of angles, depending on how far up the cord organizer engages the side of the mobile device. See also FIGS. 4A-4H, 9A-9F, 10A-10F, and 11A-11G.

Figure 4A:
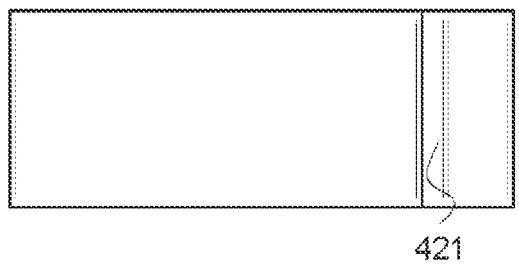
FIG. 4A shows a plan view of a cord organizer according to another embodiment.
Figure 4B:
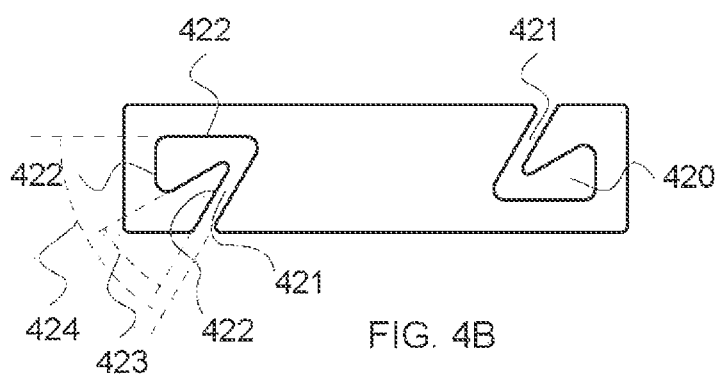
FIG. 4B shows a front side elevation view of the cord organizer shown in FIG. 4A.
Figure 4C:
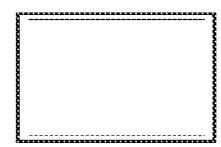
FIG. 4C shows a right side elevation view of the cord organizer shown in FIG. 4A.
Figure 4D:
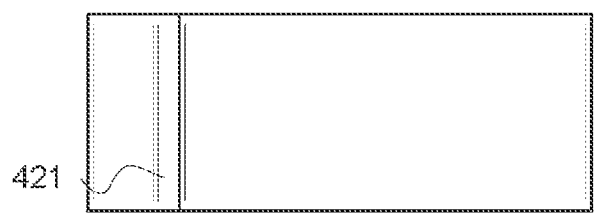
FIG. 4D shows a view from the bottom side of the cord organizer shown in FIG. 4A.
Figure 4E:
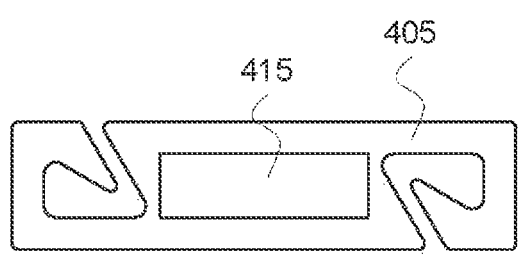
FIG. 4E shows a rear side elevation view of the cord organizer shown in FIG. 4A.
Figure 4F:
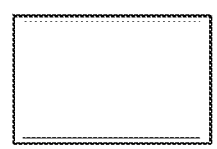
FIG. 4F shows a right left side elevation view of the cord organizer shown in FIG. 4A.
Figure 4G:
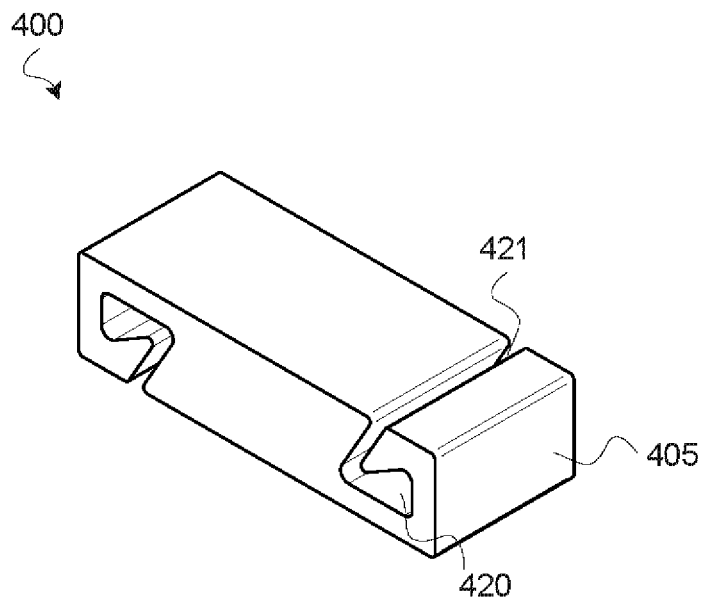
FIG. 4G shows a front side perspective view of the cord organizer shown in FIG. 4A.
Figure 4H:
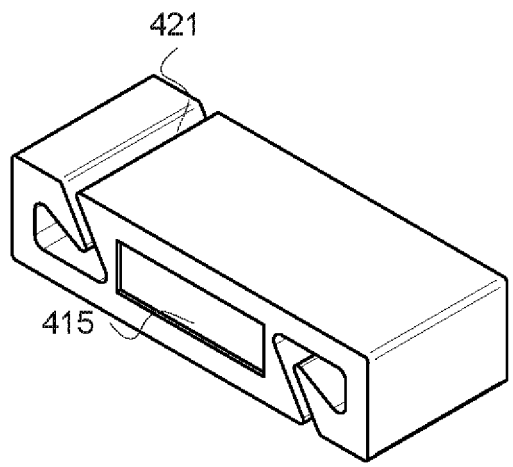
FIG. 4H shows a rear side perspective view of the cord organizer shown in FIG. 4A.

Another embodiment is shown in FIGS. 4A-H. Referring to FIG. 4G, a cord organizer 400 has a main body 405 and, in FIG. 4H, a weight 415 visible on the rear side. End channels 420 communicate between the first pair of sides of the organizer, arranged symmetrically about the main body's common point of reference. The end channel passages 421 communicate from the interior of the end channels to outside of the main body via opposite ones of the first pair of sides.

Returning to FIG. 4B, the cross-sections of the end channels have the shape of a triangle with rounded corners. The triangle has three walls 422. In this instance, the end channel passage extends from a junction of two of the walls 422. A distal wall of the passage forms a first acute angle 423 with one side of the triangle cross section while a proximal wall of the passage forms a second acute angle 424 with another side of the triangle cross section, the first acute angle 423 being smaller in angular measure than the second acute angle 424. The union of the end channel and the end channel passage cooperate to make it easier to introduce an object such as a cord or the end of a mobile device into the end channel than to withdraw it.

The embodiment of FIGS. 5A-5M differs from the previous embodiments in that the end channel passages 521 communicate from the interior of the end channels 520 to the outside of the main body through the third pair of sides, the main body left side and the main body right side. Another difference is that this embodiment also includes one or more cable channels 530.

The main body of the organizer 500 in this embodiment has four cable channels 530 which may be referred to as a first cable channel, a second cable channel, a third cable channel, and a fourth cable channel. Four cable channels is only an example; other embodiments have a different number of cable channels.

The cable channels communicate between the first pair of sides, namely, between the main body front side and the main body rear side. Each of the cable channels in this embodiment has a cable channel passage 531 that communicates between the given cable channel 530 and the outside of the main body 505 via one of the second pair of sides, namely, between the cable channel and the main body top side or the main body bottom side.

The cable channels 530 have generally uniform cross-sectional profiles where they are crossed by the second plane. The end channels 520 have generally uniform cross-sectional profiles as each other but not the same, in this embodiment, as the profiles of the cable channels. As shown in at least FIG. 5B, the end channel cross-sectional area is greater than the cable channel cross-sectional area.

To make it easier for a user to push cables into the cable channels through the cable channel passages, the top and bottom sides have been provided with triangular cutaways that widen the cable channel passages near their ends. The end channels in this embodiment do not have such triangular cutaways but, in alternative embodiments, the end channels do.

Figure 5A:
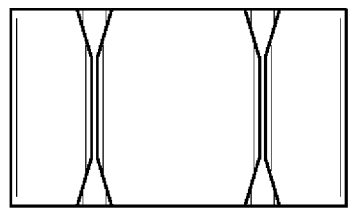
FIG. 5A shows a plan view or a view from the bottom of a cord organizer according to yet another embodiment.
Figure 5D:
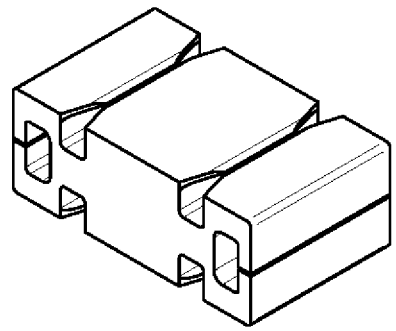
FIG. 5D shows a front side perspective view of the cord organizer shown in FIG. 5A.
Figure 5B:
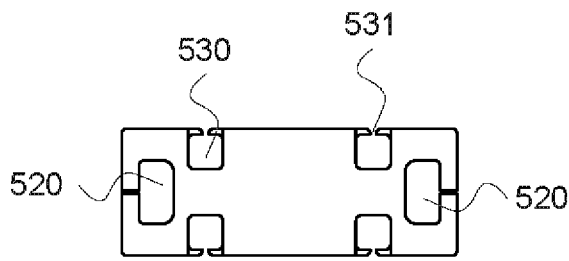
FIG. 5B shows a front side elevation view of the cord organizer shown in FIG. 5A.
Figure 5E:
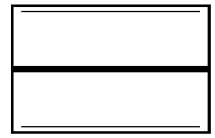
FIG. 5E shows a right side elevation view or a left side elevation view of the cord organizer shown in FIG. 5A.
Figure 5C:
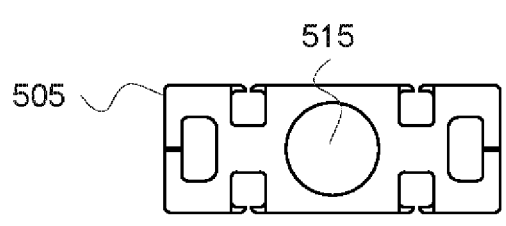
FIG. 5C shows a rear side elevation view of the cord organizer shown in FIG. 5A.
Figure 5F:
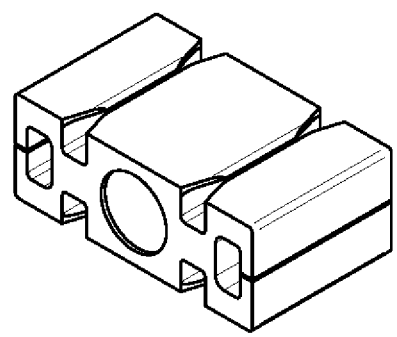
FIG. 5F shows a rear side perspective view of the cord organizer shown in FIG. 5A.
Figure 5G:
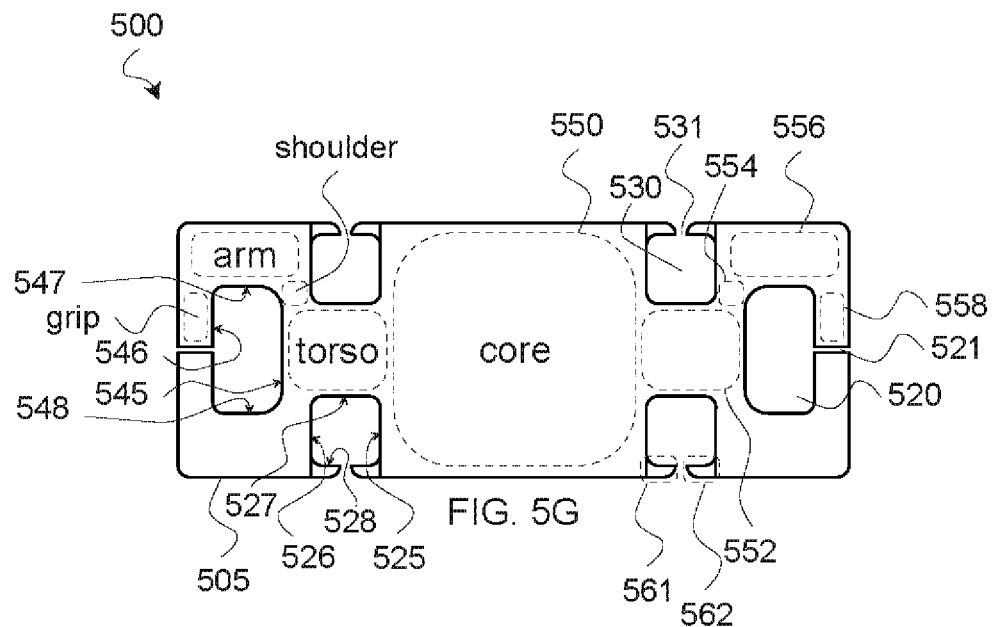
FIG. 5G shows a more detailed version of the front side elevation view in FIG. 5B.

FIG. 5G helps explain how various parts of the organizer 500 are named. A main body core 550 surrounds the common reference point and, in this embodiment, stores a weight 515 (visible in FIG. 5C). A first torso 552 extends to one side of the main body core 550. A second torso 552 extends to the other side. The torso extends from the main body core 550 toward one of the third pair of the sides. Each torso has a torso height, in the direction of the third axis, that is less than the main body height.

Each torso has two respective shoulders, such as the right upper shoulder 554 shown on the upper side of the right torso 552. An arm extends from each shoulder, such as the right upper arm 556 that extends from the right upper shoulder 554. The arm extends toward one of the third pair of the sides of the main body, namely, toward the left side or the right, depending on which arm. A grip extends from each arm, such as the right upper grip 558 that extends from the right upper arm 556. The grip extends parallel to the third plane and is spaced from its torso by an end channel.

In the embodiment of FIGS. 5A-5M, two torsos extend from the main body core, two shoulders from each torso, an arm from each shoulder, and a grip from each arm. The grips extend from each arm toward each other in a common plane that is parallel to the third plane.

Returning to FIG. 5G, a cable channel 530 has a cross section, along the second plane, that is square with rounded corners. The cable channel 530 has a proximal cable channel wall 525, a distal cable channel wall 526, an inner cable channel wall 527, and an outer cable channel wall 528. The cable channel passage 531 passes through the center of the outer cable channel wall 528 in this embodiment. The cable channel has a cable channel width between the distal cable channel wall 526 and the proximal cable channel wall 525.

The cable channel passage 531 cuts through the outer cable channel wall 528, forming a main body extension 561 and an arm extension 562. The main body extension 561 extends from the main body 505 toward the arm 556, being spaced from the arm 556 by the cable channel passage 531 and from the torso 552 by the cable channel 530. The arm extension 562 extends from the arm 556 toward the main body extension 561, being spaced from the torso 552 by the cable channel 530 and being spaced from the main body extension 561 by the cable channel passage 531.

Together, the main body core 550, the torso 552, the shoulder 554, the arm 556, the main body extension 561, and the arm extension 562 define the cable channel 530 and the cable channel passage 531.

The end channel 520 has a cross section, along the second plane in this embodiment, that is a rectangle with rounded corners. The end channel 520 has a proximal end channel wall 545, a distal end channel wall 546, an upper end channel wall 547, and a lower end channel wall 548. The end channel passage 521 passes through the center of the distal end channel wall 546 in this embodiment, helping form two grips 558, namely, an upper grip and a lower grip.

Together, a torso 552, its two shoulders 554, their respective arms 556, and their respective grips 558 define a given end channel 520.

Figure 5H:
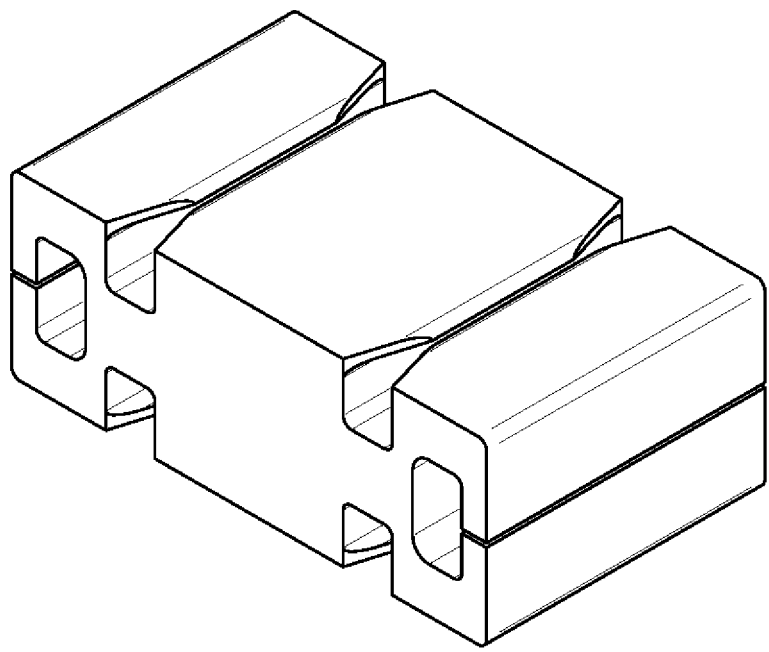
FIG. 5H shows a more detailed version of the front side perspective view in FIG. 5D.
Figure 5I:
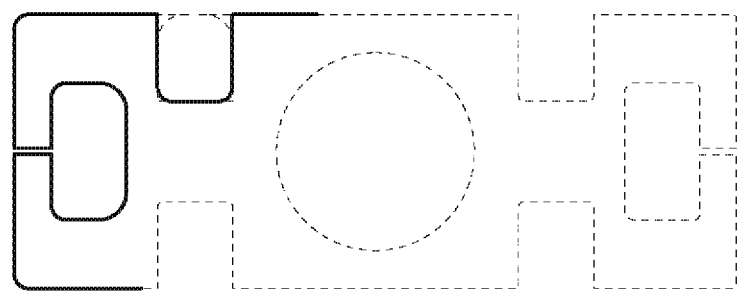
FIG. 5I shows a rear side elevation view of the cord organizer shown in FIG. 5A but with dashed lines to emphasize options.

FIG. 5I (five-eye) shows, in solid lines, parts of this given embodiment first to be discussed with respect to variations. The end channel in this drawing has a cross-sectional shape that approximates a majuscule letter "D." The corners of the cross section may assume a curvature different from that shown. The walls may meet at a ninety-degree corner instead of a curved corner. The proximal end channel wall 545 may be entirely rounded with no flat portion. The entire end channel 520 may have a circular cross section with no discernible walls other than an internal wall that is continuous save for the end channel passage 521. These same variations may be made to the cable channel 530.

Moving on to the dotted line portions, the weight can assume shapes other than the cylindrical shape that corresponds to the weight cavity of the organizer 500. For example, the weight (and weight cavity) may have a square or rectangular cross section instead of the circular cross section shown in the drawing. As previously mentioned, the weight may appear in one location or it may be disposed in two or more locations. Likewise, although the drawing shows four cable channels in all, an implementation consistent with this embodiment may have just one cable channel or it may have any number of cable channels. Similarly, the drawing shows two end channels but an implementation consistent with this embodiment may have just one end channel.

Returning to FIGS. 5G and 5H, the particular embodiment has the cable channels spaced symmetrically spaced from the common point of reference of the main body, with pairs of the cord channels on opposite sides of the cord organizer. In particular, the top side cable channels are symmetric about the third plane, as are the bottom side cable channels. The cable channels on the right side of the main body are symmetric about the first plane, as are the left side cable channels. Here, each one of the cable channels is symmetric with each adjacent one of the cable channels (i.e., the one to the side of it or the one above or below it) around one of the first or third planes of the main body.

Figure 5J:
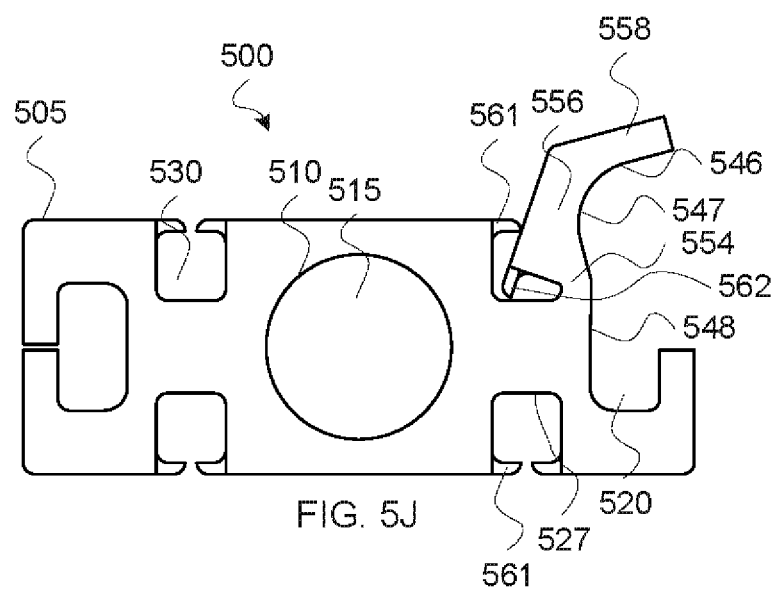
FIG. 5J shows a rear side elevation view of the cord organizer shown in FIG. 5A where one part of the end channel has been opened.
Figure 5K:
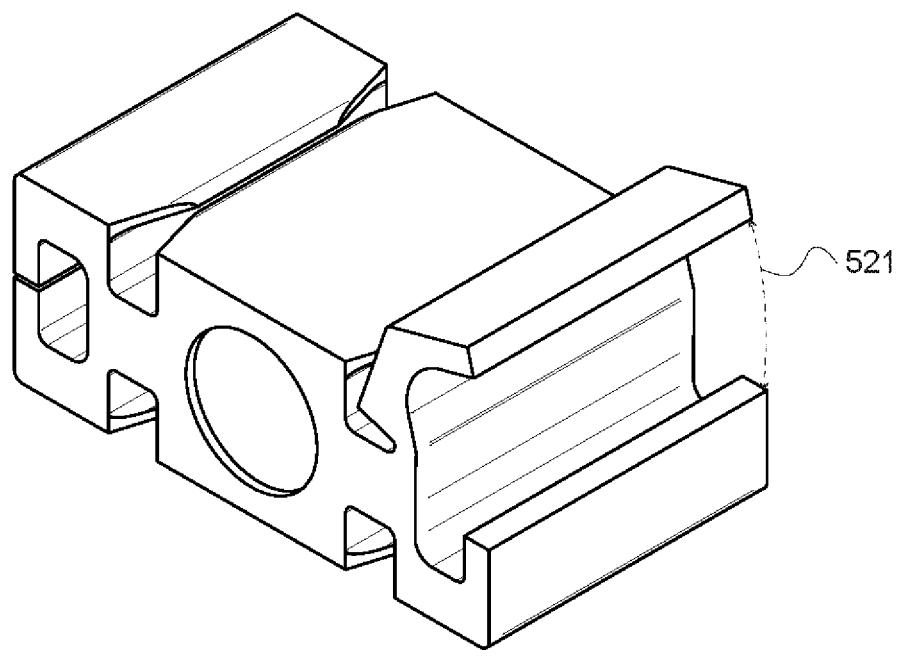
FIG. 5K shows a rear side perspective view of the cord organizer shown in FIG. 5J.

Turning to FIG. 5J, the organizer 500 is shown from a rear elevation view. The main body 505 surrounds weight 515 which is accommodated within weight cavity 510. This drawing shows how the positioning of the cable channel 530 gives the organizer 500 a useful, functional advantage over some other embodiments.

Because the cable channel 530 and the end channel passage 521 form a shoulder 554, and because the shoulder 554 is made of elastomeric material, the grip 558 and the arm 556 can be lifted upward (as shown in FIG. 5J, or downward, depending on which arm one manipulates, or upward and downward as discussed below). This design allows the end channel passage 521 to open expansively because the shoulder 554 acts like a hinge and the cable channel 530 is large enough to allow the arm 556 and its arm extension 562 to swing around into the cable channel 530 until the arm extension 562 contacts the inner cable channel wall 527.

The end channel passage 521 can be opened even further by bending the grip 558 even further toward the top side of the organizer 500 at the joint between the grip 558 and the arm 556.

Figure 5L:
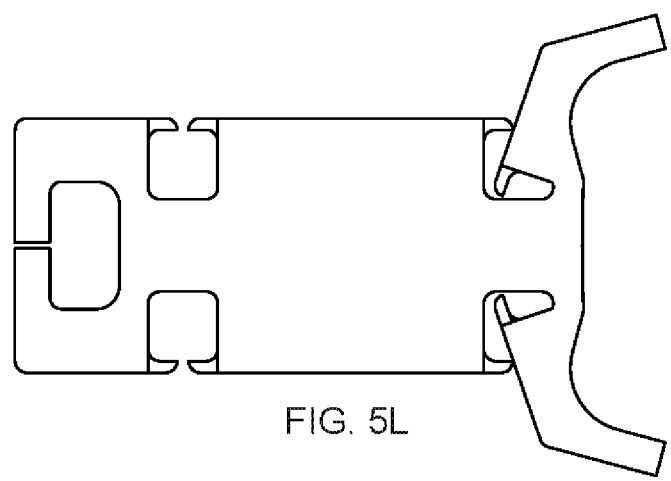
FIG. 5L shows a plan view of the cord organizer shown in FIG. 5A where two parts of the end channel have been opened and turned on one side.
Figure 5M:
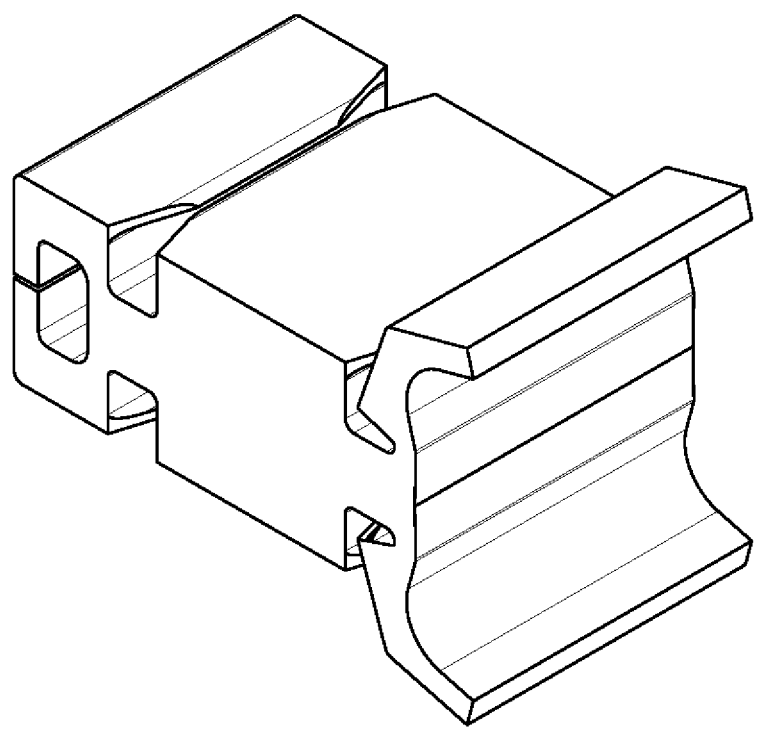
FIG. 5M shows a perspective view of the cord organizer shown in FIG. 5L.

FIGS. 5L and 5M show what it looks like when the upper and lower arms are separated: the end channel passage 521 expands to where the ends of each grip 558 now tilt more than ninety degrees over from where each grip's end started. As shown in FIG. 5M, the arms and grips can act like jaws that can be forced open, owing to the helpful positioning and size of the cable channels to which they are adjacent.

Figure 6A:
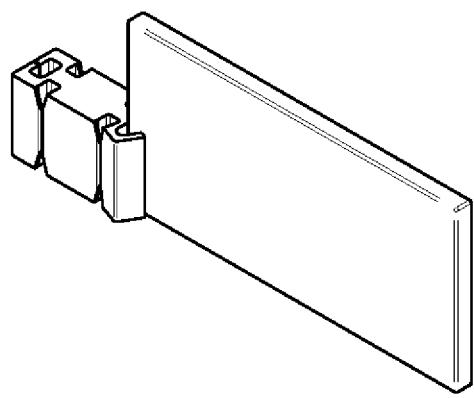
FIG. 6A shows a perspective view of the cord organizer from FIGS. 5A-5L together with a mobile device.
Figure 6B:
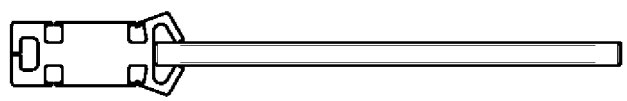
FIG. 6B shows a plan view of the cord organizer and mobile device from FIG. 6A.
Figure 6C:
FIG. 6C shows an elevation view of the cord organizer and mobile device from FIG. 6A, from one side.
Figure 6E:
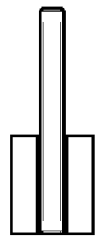
FIG. 6E shows an elevation view of the cord organizer and mobile device of FIG. 6A, from one end.
Figure 6D:
FIG. 6D shows a bottom view of the cord organizer and mobile device from FIG. 6A.
Figure 6F:
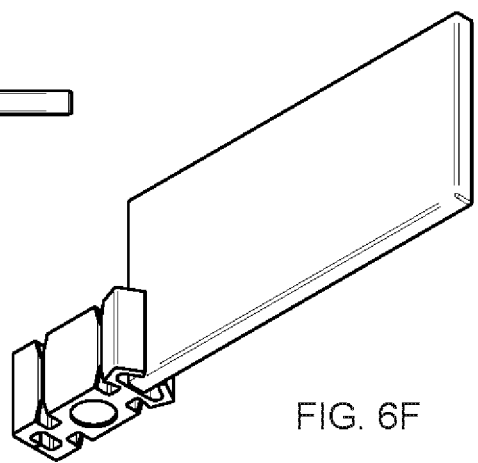
FIG. 6F is similar to FIG. 6A, but from a different perspective.
Figure 6G:
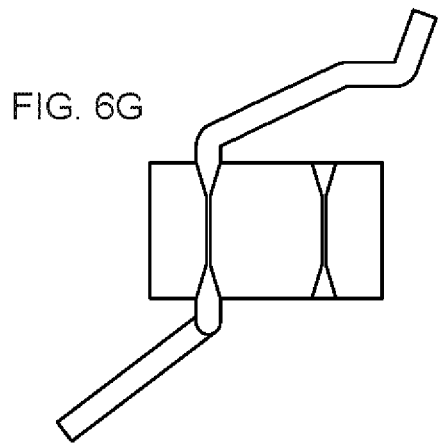
FIG. 6G shows a plan view of a cord organizer holding a portion of a cord.
Figure 6K:
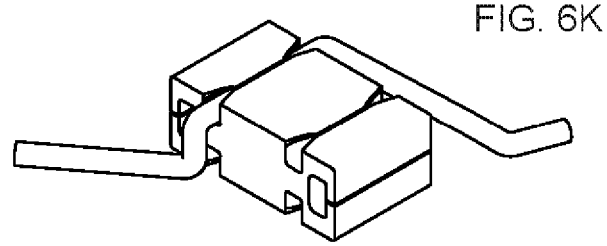
FIG. 6K shows a front perspective view of the cord organizer and cord of FIG. 6G.
Figure 6H:
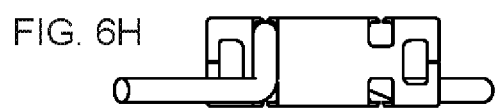
FIG. 6H shows a front elevation view of the cord organizer and cord of FIG. 6G.
Figure 6L:
FIG. 6L shows a right side elevation view of the cord organizer and cord of FIG. 6G.
Figure 6I:
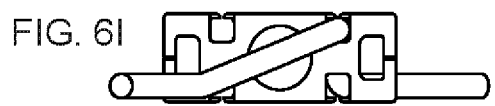
FIG. 6I shows a rear elevation view of the cord organizer and cord of FIG. 6G.
Figure 6M:
FIG. 6M shows a left side elevation view of the cord organizer and cord of FIG. 6G.
Figure 6J:
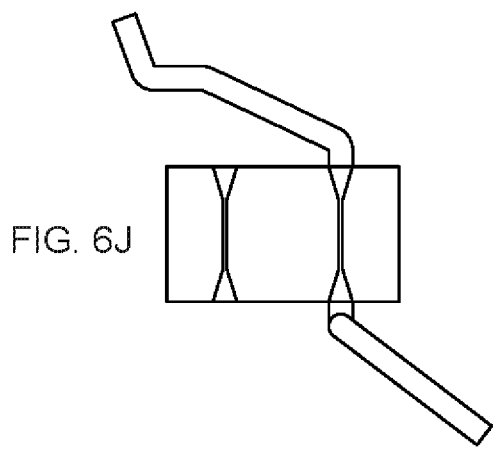
FIG. 6J shows a bottom view of the cord organizer and cord of FIG. 6G.
Figure 6N:
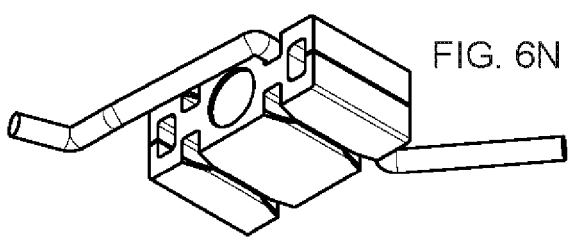
FIG. 6N shows a rear perspective view of the cord organizer and cord of FIG. 6G.
Figure 6O:
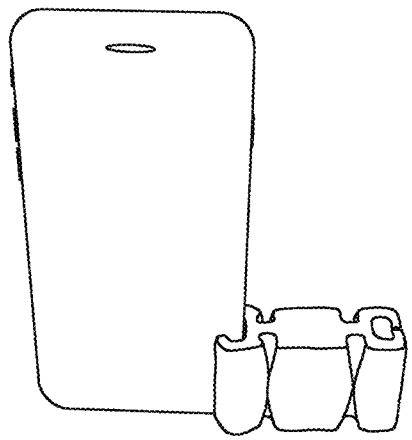
FIG. 6O is an illustration of an embodiment of the cord organizer holding a mobile device in a portrait orientation.
Figure 6Q:
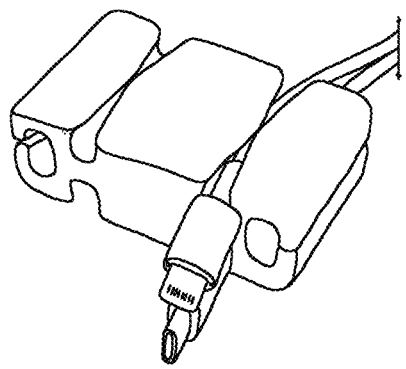
FIG. 6Q is an illustration of an embodiment of the cord organizer holding two cord ends.
Figure 6P:
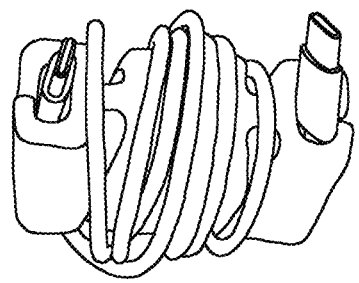
FIG. 6P is an illustration of an embodiment of the cord organizer assembled together with an example mobile device cord.
Figure 6R:
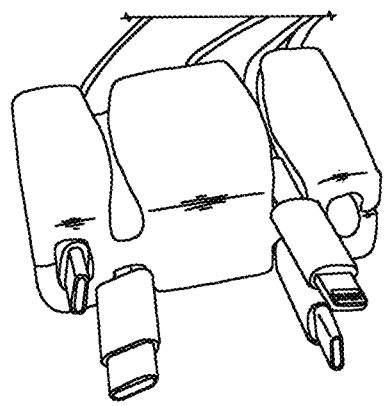
FIG. 6R is an illustration of an embodiment of the cord organizer holding three ends in cable channels and accommodating one end inside an end channel.
Figure 7A:
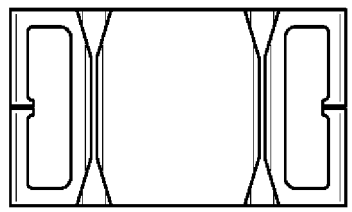
FIG. 7A shows a plan view of a cord organizer according to a different embodiment.
Figure 7D:
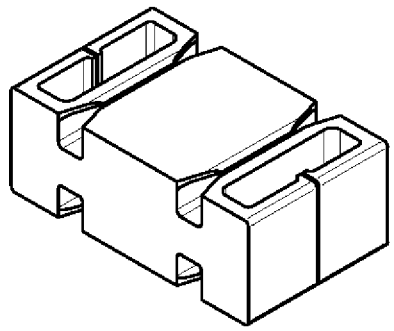
FIG. 7D shows the cord organizer of FIG. 7A from a front side perspective view.
Figure 7B:
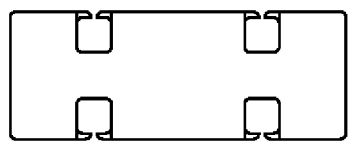
FIG. 7B shows the cord organizer of FIG. 7A from a front side elevation view.
Figure 7E:
FIG. 7E shows the cord organizer of FIG. 7A from a left- or right-side elevation view.
Figure 7C:
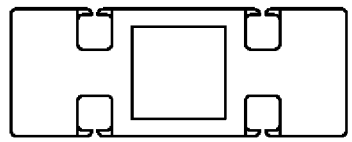
FIG. 7C shows the cord organizer of FIG. 7A from a rear side elevation view.
Figure 7F:
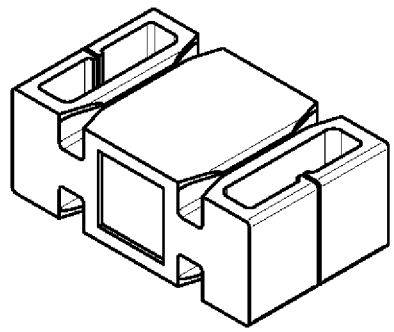
FIG. 7 F shows the cord organizer of FIG. 7A from a rear side perspective view.
Figure 8A:
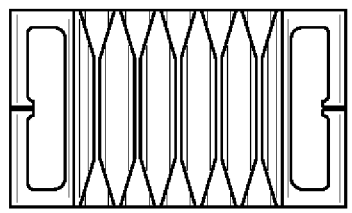
FIG. 8A shows a plan view of a cord organizer according to another different embodiment.
Figure 8D:
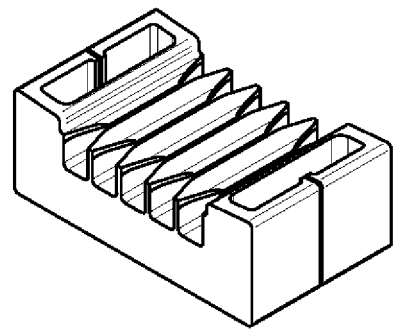
FIG. 8D shows the cord organizer of FIG. 8A from a front side perspective view.
Figure 8B:
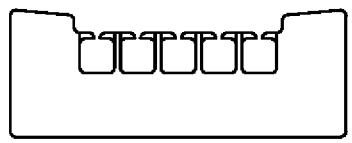
FIG. 8B shows the cord organizer of FIG. 8A from a front side elevation view.
Figure 8E:
FIG. 8E shows the cord organizer of FIG. 8A from a left- or right-side elevation view.
Figure 8C:
FIG. 8C shows the cord organizer of FIG. 8A from a rear side elevation view.
Figure 8F:
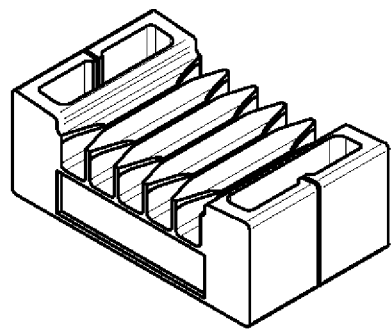
FIG. 8F shows the cord organizer of FIG. 8A from a rear side perspective view.
Figure 9A:
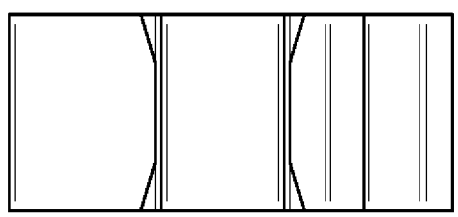
FIG. 9A shows a plan view of a cord organizer according to a further embodiment.
Figure 9D:
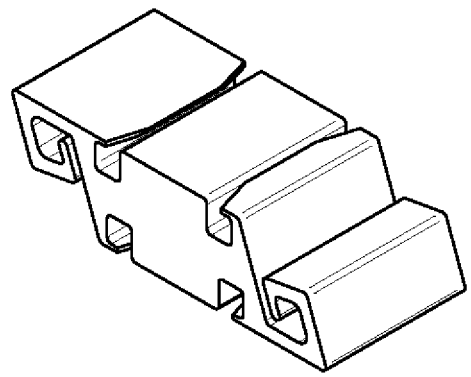
FIG. 9D shows the cord organizer of FIG. 9A from a front side perspective view.
Figure 9B:
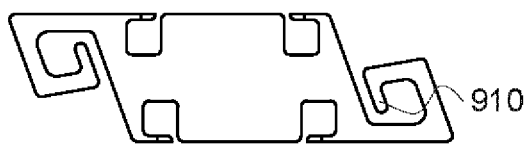
FIG. 9B shows the cord organizer from FIG. 9A from a front side elevation view.
Figure 9E:
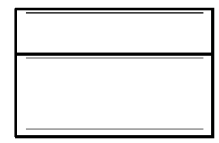
FIG. 9E shows the cord organizer of FIG. 9A from a left- or right-side elevation view.
Figure 9C:
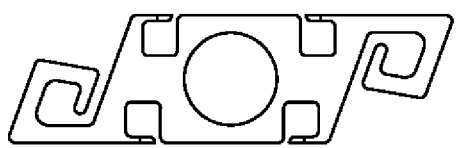
FIG. 9C shows the cord organizer of FIG. 9A from a rear side elevation view.
Figure 9F:
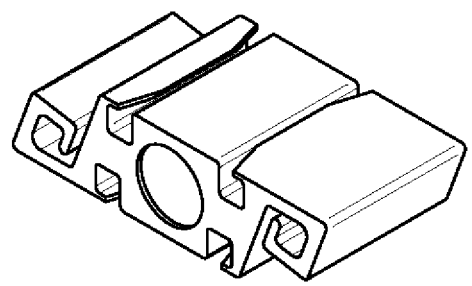
FIG. 9F shows the cord organizer of FIG. 9A from a rear side perspective view.
Figure 10A:
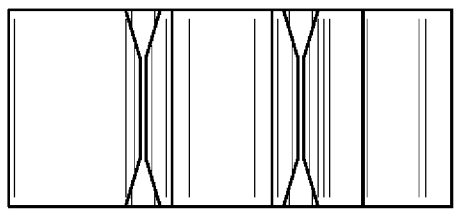
FIG. 10A shows a plan view of an additional embodiment of a cord organizer.
Figure 10D:
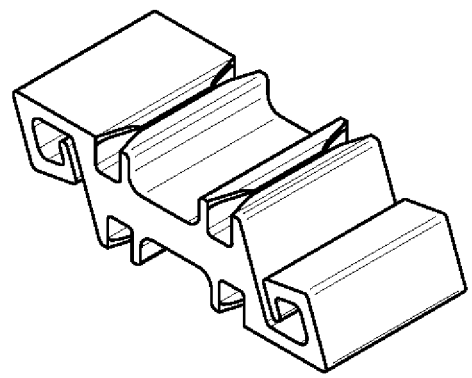
FIG. 10D shows the cord organizer of FIG. 10A from a front side perspective view.
Figure 10B:
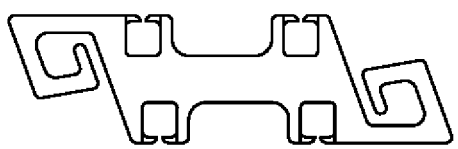
FIG. 10B shows a front side elevation view of the cord organizer shown in FIG. 10A.
Figure 10E:
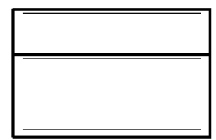
FIG. 10E shows the cord organizer of FIG. 10A from a left- or right-side elevation view.
Figure 10C:
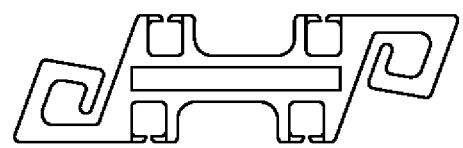
FIG. 10C shows the cord organizer of FIG. 10A from a rear side elevation view.
Figure 10F:
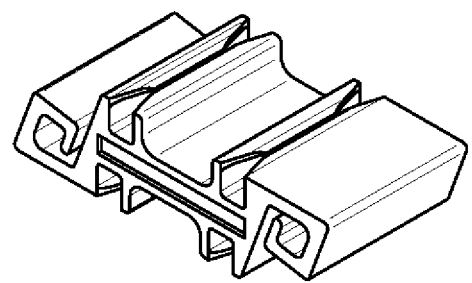
FIG. 10F shows the cord organizer of FIG. 10A from a rear side perspective view.
Figure 11A:
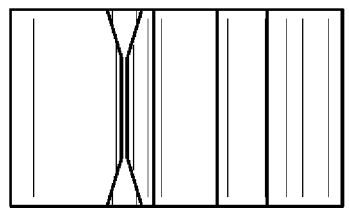
FIG. 11A shows a plan view of another additional embodiment of a cord organizer.
Figure 11E:
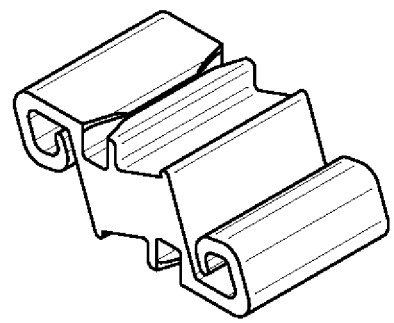
FIG. 11E shows the cord organizer of FIG. 11A from a front side perspective view.
Figure 11B:
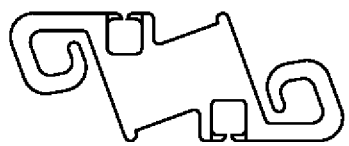
FIG. 11B shows the cord organizer of FIG. 11A from a front side elevation view.
Figure 11F:
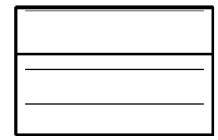
FIG. 11F shows the cord organizer of FIG. 11A from a left- or right-side elevation view.
Figure 11C:
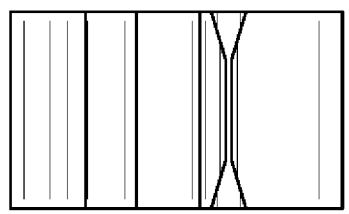
FIG. 11C shows the cord organizer of FIG. 11A when viewed from the bottom.
Figure 11D:
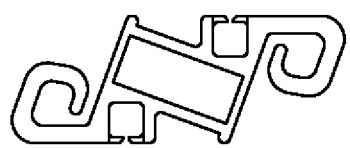
FIG. 11D shows the cord organizer of FIG. 11A from a rear side elevation view.
Figure 11G:
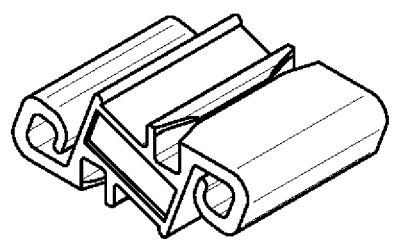
FIG. 11G shows the cord organizer of FIG. 11A from a rear side perspective view.

FIGS. 6A-6R show several beneficial ways the organizer 500 finds use with cords and mobile devices.

FIGS. 6A-6F show, from different views, one way that the organizer 500 can advantageously hold a mobile device in a landscape orientation. The weight of the cord organizer, thanks to the presence of the weight 515 within the main body 505, makes the cord organizer substantial enough to hold the mobile device this way on a horizontal surface. The jaws of the cord organizer, as shown best in FIGS. 6B, 6D, and 6F, open wide enough to accommodate the mobile device even if it has a bulky protective cover.

FIGS. 6G-6N show the organizer 500, from different views, holding a middle section of a cord. The cord does not need to be threaded through the cable channel because any section of the cord may be simply pressed through the cable channel passage 531 and into the cable channel 530. The main body extension 561 and the arm extension 562, being made of elastomeric material, deform inward toward the inner cable channel wall 527 when a user presses a cord into the cable channel passage 531, allowing the cable channel 530 to receive the cord. The main body extension 561 and the arm extension 562 then return to their original positions, retaining the cord within the cable channel 530. Similarly, when a user pulls the cord away from the cable channel 530, the main body extension 561 and the arm extension 562 again deform to permit the cord to exit the cable channel passage 531.

FIG. 6O (six oh) is similar to FIG. 6A except that the organizer 500 holds the mobile device in a portrait orientation.

FIG. 6P shows how the organizer 500 can accommodate a mobile device cord by trapping the cord's end connectors, one per end channel 520, with the middle part of the cord wrapped around the main body between the two connectors. This utility keeps the cord tidy without unraveling, making the assembly convenient and helpful to use in a briefcase, handbag, utility pocket, or the like.

FIG. 6Q shows how the organizer 500 helps keep multiple cords organized on a desktop, nightstand, or the like. The cable channels are adapted to allow mobile device cords to slide through as desired, but to prevent small connectors from passing through. This adaptation in size allows users to anchor their cords in place, even when disconnected from their mobile device(s), without the annoyance of the cords sliding off the desktop or nightstand when gravity works to urge the cord in that direction. FIG. 6R shows the organizer 500 keeping three cords organized via the cable channels and one via an end channel. The end channel has a cross-sectional area that is larger than that of the cable channel. This is to help make it possible to achieve the benefits already described above and depicted in FIGS. 5K and 5M. Smaller cord connectors that cannot fit through a cable channel might fit through the end channel, but larger cord connectors such as standard USB connectors or electrical plugs will not fit through.

FIGS. 7A-7F show different views of a cord organizer similar to the organizer 500 except that the end channels communicate between the second pair of the sides of the main body (that is, through the top and bottom) instead of communicating between the first pair of sides (the front and rear). This embodiment permits the user to engage the cord organizer and a mobile device, similar to the way shown in FIGS. 6A-6F and 6O without having to tilt the cord organizer on one of its first pair of sides, namely, without having to rest it on the top side or the bottom side. As shown in FIGS. 7A-7F, the mobile device can be stood up at the same time that various cords can still be accommodated within the cable channels. This advantage is also seen in the embodiment of FIGS. 8A-8F.

FIGS. 8A-8F are similar to the embodiment of FIGS. 7A-7F, but the top side has the cable channels and none are on the bottom side. The end channels extend upward a little from the level at which the outer cable channel walls 528 stand, providing a slight recess along the top to make it easier to retain a cord when it is wrapped around the main body for the sake of transport. Here, the weight 515 can extend beneath all of the cable channels.

The embodiment of FIGS. 9A-9F provides end channels, but each of these has only one jaw-like appendage. The flexibility of the elastomeric material allows these appendages to uncoil enough to help hold in place a mobile device or the like. Consider the cord organizer shown in FIG. 9B. The right side is canted at an angle of around ten or twenty degrees from the vertical. When a user uncoils the right side end channel and slides in a mobile device, the device tilts backward, directly over the cord organizer. In this way, the cord organizer acts to cantilever the mobile device and support it at a useful viewing angle. Depending on the length of this embodiment of the cord organizer, it might support the mobile device even without a weight and weight cavity. In other words, this embodiment of the cord organizer may provide cord management, cord wrapping, and device holding functions with only the main body, avoiding the need for forming a weight cavity or inserting a weight. In this embodiment, the cord organizer can support a mobile device without needing to tip the cord organizer on either of its first pair of sides, meaning that the cable channels can remain in a useful position to manage the user's cords while still holding the user's mobile device. In this embodiment, the jaw-like appendage includes a tooth portion 910 that is provided to help catch the edge of the case that wraps around the front of the user's mobile device, if it has one. A similar tooth extends from the grip of the end channel in other embodiments as can be seen in FIGS. 7A, 8A, 10B, 11B, 12B.

This same advantage accrues in the embodiment shown in FIGS. 10A-10F. This embodiment, however, thins the main body core from the top and bottom sides to achieve a recessed area between the cable channels to enhance the ability of the cord organizer to accommodate cords, and even longer cords, for transport.

The embodiment shown in FIGS. 11A-11G is similar to that of FIGS. 10A-10G, but it has only one cable channel on the top and only one on the bottom. Omitting the second cable channel from these sides achieves room for a cable-wrapping recess between the proximal cable channel wall and the uppermost (or lowermost) point from which the inclined surface, that leads into the end channel, extends.

The embodiment of FIGS. 12A-12G is asymmetrical with respect to the first plane. Each of the first pair of sides has two cable channels spaced from each other by cable-wrap recesses; the recess in the top side is not as long as the recess in the bottom side. Because these cord-wrap recesses can also accommodate cables laid out on a horizontal surface such as a desktop or nightstand, they provide cord-organizing functionality even when the cords are not wrapped for transport. A user can simply drop the recess in the bottom side over a cord to help keep it managed, avoiding the need to manually urge the cord inside a cable channel.

FIGS. 13A-13F depict an attachment adapted for use with the organizer 500 shown in FIGS. 5H, for example, by insertion into one of the lower cable channels of the cord organizer. FIGS. 14A-14F illustrate another similar attachment adapted for use with the organizer 500 by insertion into one of the end channels. These particular attachments can be adapted for use with the other cord organizer embodiments by taking into account their respective geometries.

Figure 13A:
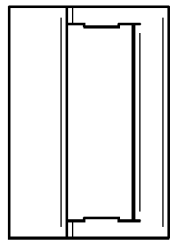
FIG. 13A shows a plan view of a cable channel attachment according to an embodiment.
Figure 13D:
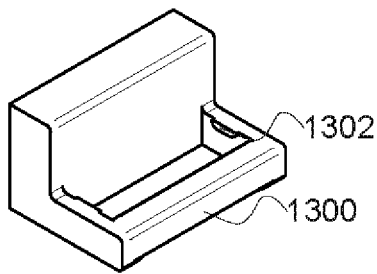
FIG. 13D is a front side perspective view of the cable channel attachment of FIG. 13A.
Figure 13B:
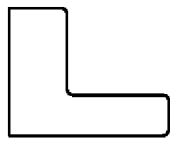
FIG. 13B shows the cable channel attachment of FIG. 13A from a left- or right-side elevation view.
Figure 13E:
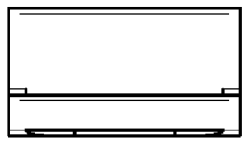
FIG. 13E is a front side elevation view of the cable channel attachment of FIG. 13A.
Figure 13C:
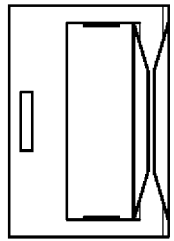
FIG. 13C is a bottom view of the cable channel attachment of FIG. 13A.
Figure 13F:
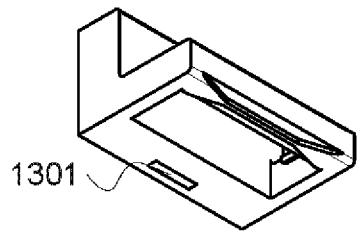
FIG. 13F is another front side perspective view of the cable channel attachment of FIG. 13A.

Looking at FIG. 13D, for example, the attachment has a crossbar 1300 that is custom-sized to fit within a cable channel and generally fill it up. Connecting bars extend from the crossbar 1300 and connect to an attachment main body. Dimples 1302 protrude from these connecting bars and are adapted to engage the lower part of an end channel in the area, for example, of proximal end channel wall 545. These dimples help restrict the attachment from rotating around the crossbar and help keep the attachment flush on one side of the organizer 500. FIG. 13F shows a plug 1301 that conceals a thin magnet within the attachment main body.

Figure 14A:
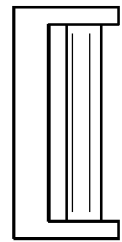
FIG. 14A shows a plan view of an end channel attachment.
Figure 14D:
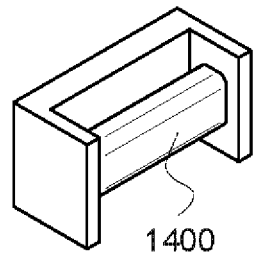
FIG. 14D is a front side perspective view of the end channel attachment shown in FIG. 14A.
Figure 14B:
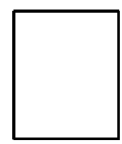
FIG. 14B shows a left- or right-side elevation view of the end channel attachment shown in FIG. 14A.
Figure 14E:
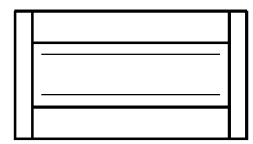
FIG. 14E is a front side elevation view of the end channel attachment shown in FIG. 14A.
Figure 14C:
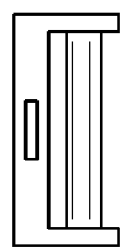
FIG. 14C is a bottom view of the end channel attachment shown in FIG. 14A.
Figure 14F:
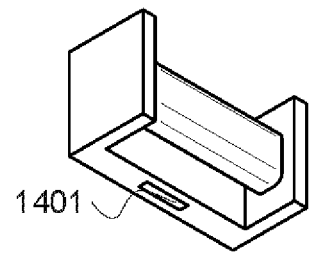
FIG. 14F is another front side perspective view of the end channel attachment shown in FIG. 14A.

Looking now to FIG. 14D, the attachment has a crossbar 1400 that is adapted to fill up the end channel 520. Because of the shape of the end channel in the organizer 500, there is no concern that the attachment will rotate and so this embodiment of the attachment does not include any dimples to preclude rotation. FIG. 14F shows the plug 1401 for concealing within the attachment main body a magnet.

Figure 15A:
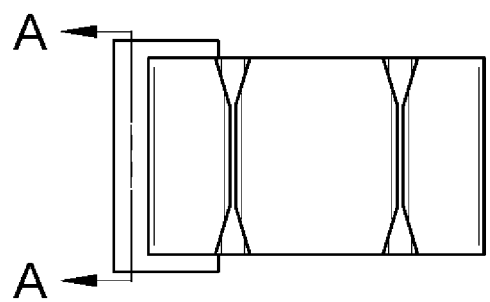
FIG. 15A is a plan view of a cord organizer assembled together with an end channel attachment.
Figure 15D:
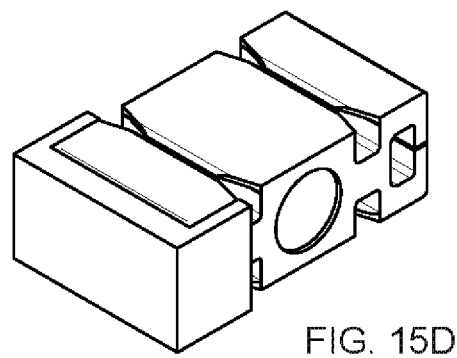
FIG. 15D is a rear perspective view of the assembly of FIG. 15A.
Figure 15G:
FIG. 15G is a cross-sectional view of the assembly in FIG. 15A along line A-A.
Figure 15B:
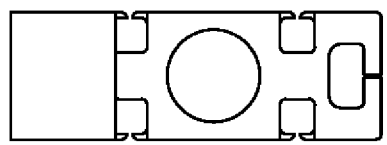
FIG. 15B is a rear side elevation view of the assembly shown in FIG. 15A.
Figure 15E:
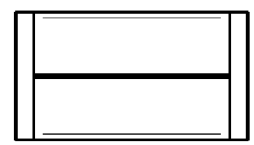
FIG. 15E is a left side elevation view of the assembly in FIG. 15A.
Figure 15C:
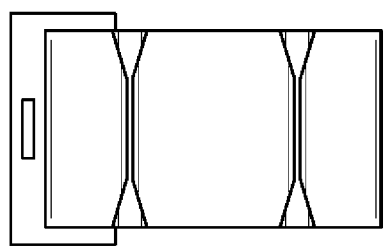
FIG. 15C is a bottom view of the assembly of FIG. 15A.
Figure 15F:
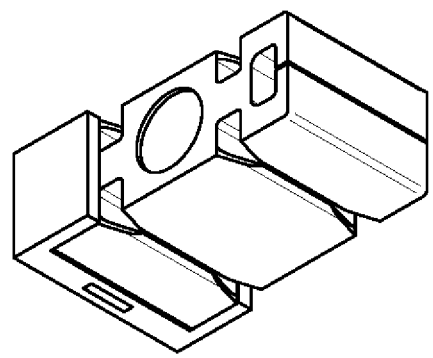
FIG. 15F is another rear perspective view of the assembly in FIG. 15A.
Figure 15H:
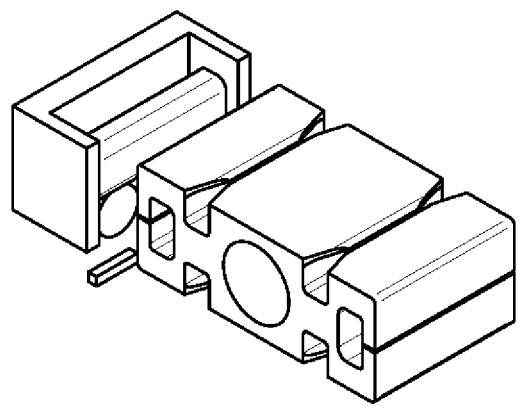
FIG. 15H is an exploded view of the assembly in FIG. 15A from a rear perspective view.
Figure 15I:
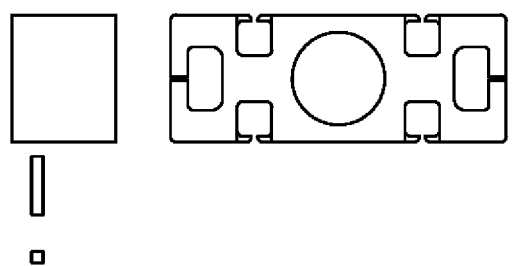
FIG. 15I is an exploded view of the assembly in FIG. 15A from a rear elevation view.
Figure 15J:
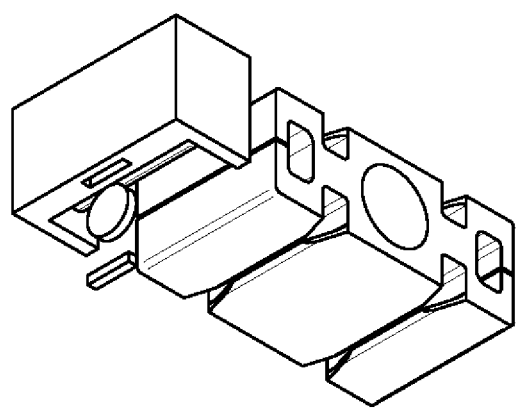
FIG. 15J is an exploded view of the assembly in FIG. 15A from another rear perspective view.
Figure 17A:
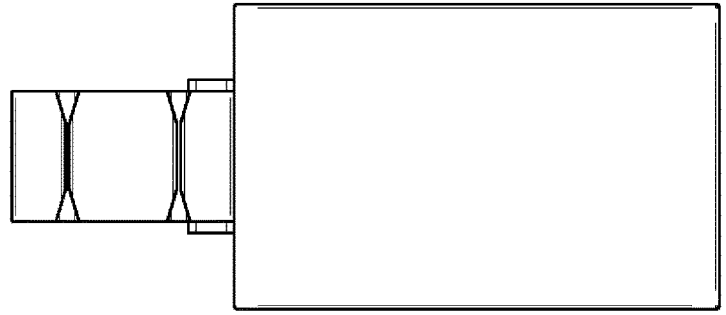
Figure 17B:
Figure 17C:
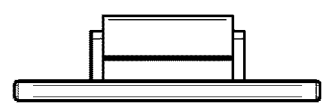
Figure 17D:
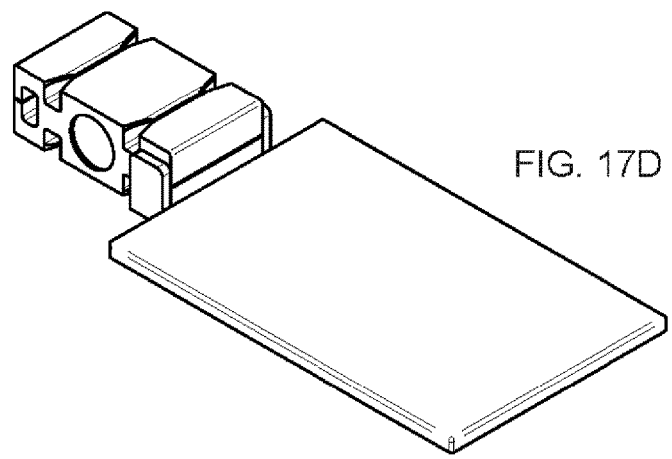
Figure 17E:
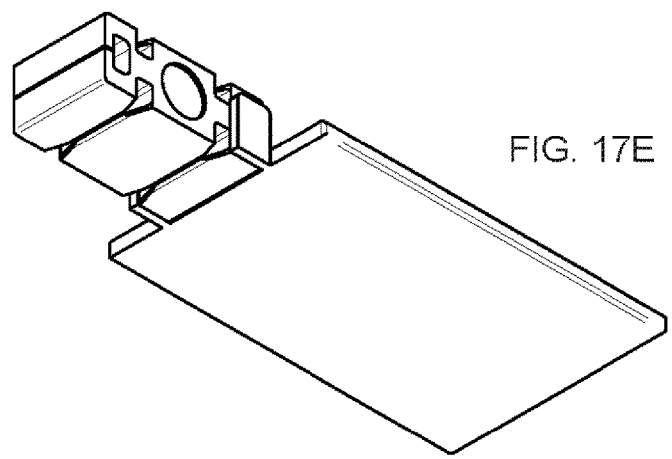

FIGS. 15A-15F show the attachment of FIGS. 14A-14F attached within an end channel of an organizer 500. FIG. 15G shows a cross section of FIG. 15A along line A-A, revealing a round magnet and illustrating plug 1401. FIGS. 15H-15J show the attachment of FIGS. 14A-14F in an exploded view.

FIGS. 16A-16F show another attachment assembled to an organizer 500 via an end channel. This attachment is, for example, an inductive charger for a mobile device that has affixed to one side an attachment such as that shown in FIGS. 14A-14F. This embodiment of an attachment does not need to have a magnet within the attachment main body because it is all one piece. The inductive charger may be of any type and have a power cord (not shown) that a user can insert into an electrical socket (not shown). Alternatively, the attachment may be a simple mobile device holder and not a charger. FIGS. 16A and 16D show a mobile device placed upon the attachment, and FIGS. 16B, 16C, 16E, and 16F do not illustrate a mobile device.

FIGS. 17A-17E show an attachment similar to that of FIGS. 16A-16F, but with the part of the mobile device holder in a different orientation.

Figure 18A:
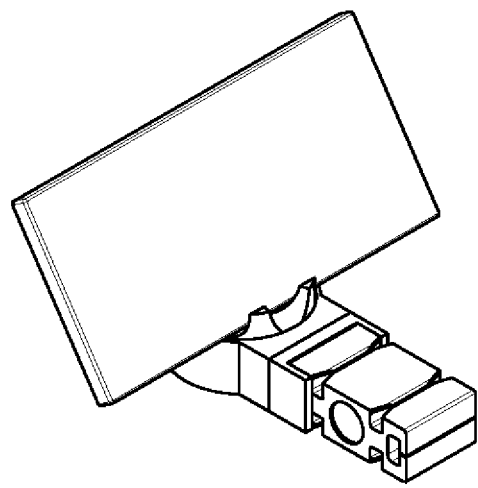
Figure 18B:
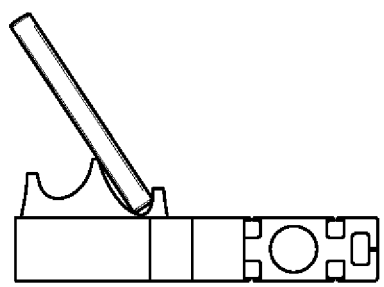
Figure 18C:
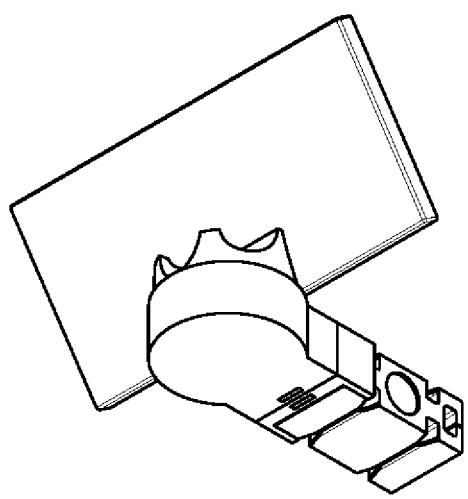

FIGS. 18A-18C show the attachment of FIGS. 14A-14F assembled together via magnetic attraction to another mobile device holder. FIGS. 18D-18F show exploded versions of the parts that make up this further embodiment of a mobile device holder. In these drawings, a mobile device M rests on a rotating pedestal 1800 in either a lower recess 1810 or an upper recess 1820. The rotating pedestal 1800 has an axial recess 1830. The rotating pedestal is received within a base 1840 which has, concealed in a base main body portion, a magnet 1850 and a plug 1860 that retains the magnet therein. A vertical axle 1870 of the base 1840 engages the axial recess 1830 of the rotating pedestal, allowing the pedestal and the mobile device to be turned by a user to any convenient angle of rotation.

The magnet in the base 1840 attracts to the magnet that rests concealed in the attachment of FIGS. 14A-14F which, in turn, is disposed within an end channel of the organizer 500, providing an assembly that keeps the whole organized and orderly. In an alternative embodiment, the faces of the base and the attachment have ridges or other mating features, such as posts and corresponding holes, in addition to the magnets, that help keep these two faces from sliding to either side, thereby enhancing the rigidity of this junction.

In contrast, the assembly shown in FIGS. 19A-19F employs the cable channel attachment depicted in FIGS. 13A-13F and previously discussed. The crossbar 1300 appears within the cable channel in FIG. 19C, mostly hidden therein but visible where the triangular cutaways of the cable channel reveal it. In FIGS. 19A-19F, a small knick-knack box has at least one side that is equipped with one or more magnets that provide a force of attraction on the magnet within the attachment shown in FIGS. 13A-13F. The box provides a convenient and organized place for the user to put small items, and optionally has a removable or hinged lid.

Turning now to FIGS. 20A-20F and 21A-21F, yet another embodiment of an attachment for organizer 500 appears. This attachment is a holder for the cord organizer itself. Although not shown, the attachment optionally contains magnets hidden in the floor portion of the attachment. Alternatively, the holder may be fixed permanently in place using adhesive on its underside. Note here that all the sides of the cord organizer itself are free of any adhesive; the attachment is what may have an adhesive. Several projections emanate, in an interior direction, from the side walls and, as shown in the drawings in FIGS. 21A-21F, engage the cable channels of the cord organizer, holding it firmly but removably in place. When the cord organizer is placed inside this holder, it will remain in place and perform its function even when mounted on the front of a refrigerator (if using the embodiment with internal magnets) or metallic whiteboard, or on the underside of a desk or table.

An assembly of the cord organizer together with this holder provides the advantage of a stronger attraction to the underlying surface (provided by the holder) without losing the cord organizer's portability (because it can be removed without trouble by pulling it out of the holder).

FIGS. 22A-22E show an example of another type of attachment adapted to work with the organizer 500, namely, a keyring retainer attachment 2200. The keyring retainer attachment 2200 has a retainer leg gap 2220 between one retainer leg 2210 and the other. At the end of the retainer leg gap 2220 is the retaining slot 2230. At the end of each retainer leg 2210 is an inward-extending retainer leg projection 2215 to help hold the retainer leg 2210 in place when engaged with the cord organizer. The keyring retainer attachment 2200 in these drawings is adapted to fit the organizer 500 but could be suitably adapted to fit other embodiments of the cord organizers that have been described above. The keyring retainer attachment 2200 has a retainer handle 2240 to make it easy to engage the keyring retainer attachment 2200 with the cord organizer. The retainer through hole 2250 provides an improved grip for the user's hand and can optionally provide the user an easy connection point to help avoid losing the keyring retainer attachment 2200.

FIGS. 23A-23E show an assembly formed by engaging the organizer 500 with the keyring retainer attachment 2200. Each retainer leg 2210 of the keyring retainer attachment 2200 is matched closely to the shape of the cable channels of the cord organizer. The retainer leg projection 2215 on each leg, when in position in the cord organizer, as best seen in FIGS. 23E and 23F, extends from the leg to grip a part of the torso around which the leg is positioned. Looking at FIG. 23E, the retaining slot 2230 gets closed off when the keyring retainer attachment 2200 is assembled with the organizer 500 because the torso 552 filles the retainer leg gap 2220.

To retain a keyring (or any other object of a suitable size), the user puts one retainer leg through their keyring so that it slides up into the retaining slot 2230. Then the user slides the two retainer legs into two cable channels 530 of the organizer 500 until the retainer leg projections make it through and start to grip the far side of the cord organizer.

FIGS. 24A-24E show an assembly of an organizer 500 and a keyring retainer attachment 2200, where a user (not shown) is applying force in the upward direction, using their fingers or the like, to bias the upper jaws of the end channels to open up. The upper jaw on each side includes a grip 558, an arm 556, and an arm extension 562.

On the left, the upper jaw can hinge upward at the shoulder 554 because the cable channel 530 adjacent the upper jaw is empty and permits the arm extension 562 and part of the arm 556 to temporarily be in the cable channel 530. The hinging motion can continue until the arm extension 562 presses down on the inner cable channel wall 527, resulting in the end channel passage 521 being widely expanded.

On the right, however, the upper jaw cannot hinge upward at the shoulder 554 because the adjacent cable channel 530 is filled up with the retainer leg 2210 of the keyring retainer attachment 2200. FIG. 24D shows how the legs of the keyring retainer attachment 2200 solidly fill the cable channels. Therefore, the right upper jaw can move a little bit through material deformation of the grip 558 and of the arm 556, but the movement is severely restricted and does not open up the end channel passage 521 much at all.

FIGS. 24A-24E also help drive home the point that placing a cable channel in the appropriate position with respect to the end channel can result in the creation of a shoulder that allows for a wide opening of the end channel passage. Having the cable channel too far away from the end channel can yield a shoulder that is too thick to function well as a hinge.

To further consider this point, return to FIG. 5G. Here, the thickness of the material between the distal cable channel wall 526 and the proximal end channel wall 545 is in the range of at least half of the width of the cable channel to at most the entire width of the cable channel, providing an appropriately thin shoulder 554.

Also, the width and depth of the cable channel 530 in this embodiment is approximately the thickness of the arm 556, making it possible for the cable channel 530 to accommodate the arm 556 when a vertical force applied to the grip 558 urges the arm to pivot about the shoulder. If the cable channel 530 has a width or depth less than the thickness of the arm 556, the arm's movement into the cable channel will be restricted to at least a degree.

Finally, consider the height of the end channel 520. The upper end channel wall 547 and the lower end channel wall 548 are closer to the top side of the cord organizer and bottom side of the cord organizer, respectively, than the inner cable channel wall 527 of either of the adjacent cable channels. This arrangement yields a shoulder thickness and an arm thickness suitable for the hinge-type movement illustrated in FIGS. 5L, 5M, 6A, 6O, and 24A, for example.

FIGS. 25A-25F show a mobile device prop 2500. The mobile device prop 2500 has a cable channel-shaped finger 2510 on the end of a connecting bar 2520. The connecting bar 2520 has a dimple 2530 that protrudes inwardly. The cable channel-shaped finger 2510 and connecting bar 2520 form a back arm 2540 of the mobile device prop 2500. Extending forward of the central part of the mobile device prop 2500 is a front arm that has a device retaining prong 2550.

FIGS. 26A-26F show an assembly formed from the organizer 500 and the mobile device prop 2500. To form the assembly, the user puts the cable channel-shaped finger 2510 on each back arm 2540 into one of the cable channels of the cord organizer. The dimples on the back arms of the prop press into the end channel arms, helping keep the rear face of the prop's central part flush against one of the third pair of sides of the cord organizer. In use, a user places their mobile device in a slot formed between the central part of the prop and the inner surface of the retaining prongs. Returning to FIG. 25B, note that a notch 2560 stands ready to arrest the movement of the mobile device, in the event it starts to tip forward, by catching on an edge of the mobile device.

FIGS. 27A-27F show a further embodiment of the cord organizer 500 in which the end channels have been provided with triangle-shaped cutaways 2710, similar to the triangle-shaped cutaways from the cable channels. In addition, each of the grips of this embodiment is thickened at its distal end, canting inward toward the interior of the end channels. The end channel passages flare out on the interior of the end channels to form a notch 2720 that helps retain the cord in general use but helps the user withdraw the cord more easily when they desire to do so.

FIGS. 28A-28H show another embodiment of the cord organizer in which vertical cable channels 2830 connect the horizontal cable channels to each other, making a waist all around the main body. This feature can provide a cable channel that can hold cables in place in most orientations in which the cord organizer may be employed.

FIGS. 29A-29H show a variation on the embodiment of organizer 500. In this variant, the width-wise upper and lower edges are raised slightly from the vertical as shown by edge 2910 in FIG. 29B. In other words, the upper arm surface's plane is angled upward with respect to the plane of the main body top side, and the lower arm surface's plane is angled downward with respect to the plane of the main body bottom side. This design provides for added stability of the top and bottom sides in the event of any unevenness introduced when the weight is pressed into the main body. In addition, if the upper and lower grips of the end channels are separated by a gap, the slightly raised edge allows the force of gravity to flatten the main body, resulting in a flatter bottom side when in contact with a horizontal surface such as a table.

The main body may be made of elastomeric material. Non-elastomeric materials may be suitable if they have a grippy nature similar to that of fifty to sixty durometer silicone rubber. Each side, in many embodiments, has this kind of grippy nature so that the main body can be used in any desired orientation and still resist movement. In other embodiments, however, the corners are augmented with a protruding covering that itself is grippy, alleviating the need for every side to be grippy.

The material should have a memory. In other words, it should be flexible but return to its original shape. The degree of memory of the parts that are meant to retain cords within the cable channels or end channels should be high, such as for the end channel grips and the main body extension 561, and the arm extension 562 (or similar parts in other embodiments).

Although the illustrated embodiments show a main body that is made of elastomeric material and a weight that is dense like metal, an alternative embodiment provides for a rigid base skeleton that is held together by tendons made of flexible material with enough memory to return the parts, to which they are connected, to their original position. For example, in the context of FIG. 5G, the torso and core could be made of rigid material and the shoulders, arms, and grips could be made of flexible material with a memory. In this alternative example, the main body extension 561 and arm extension 562 would also be made of the flexible material. Here, the flexible parts could be joined to the rigid parts in mechanical ways (e.g., T-shaped slots in the rigid parts into which T-shaped protrusions of the flexible parts are inserted) or joined by adhesives.

The cable channel passages, as illustrated, reflect current manufacturing limitations. There is no need for a gap between the main body extension 561 and the arm extension 562, however, as long as the two parts are distinct from each other and can separate when a user presses a cable into the cable channel.

The entrance side of the cable channel passage (i.e., from the outside going to the inside) is rounded toward the middle so as to funnel the cord into the cable channel. The underside of the main body extension 561 and the arm extension 562, however, is not rounded and this helps prevent cords from escaping through from the inside to the outside.

A number of embodiments of attachments have been shown which, when connected with some of the cord organizer embodiments, form assemblies that provide enhanced functionality. Additional attachments can be created from these. For example, in one alternative embodiment (not shown), two of the attachments from FIGS. 13A-13F or from FIGS. 14A-14F are integrated together, back to back, so that their crossbar features extend outwardly in opposite directions. This embodiment is useful for joining together two cord organizers into a single assembly, thereby expanding the ability of the assembly to manage cords to twice as many.

In the embodiments shown, the cable channels are narrow enough in cross section to prevent the connectors on commonly-used cords from sliding through. Today's connectors typically have a dimension that is about six millimeters. As connectors change size in the future, the size of cable channels should be adjusted. In an alternative embodiment, however, a cord organizer for electrical cords is provided; here, the cable channels could be made larger because electrical cords have connectors that are themselves large compared to mobile device cords.

The weight cavity, as illustrated, accommodates a simple weight. In alternative embodiments, the weight is a magnet and enables the cord organizer to attach to suitable surfaces using magnetic attraction. In other alternative embodiments, the weight is a mobile device charger containing one or more batteries. Such a charger has suitable ports for charging the mobile device and, if needed, for recharging the batteries. In a variant of this alternative embodiment, the mobile device charger's ports open to the rear side of the cord organizer such as where the weight is exposed in FIG. 7F. In another variant, the mobile device charger's ports are not exposed in this manner, but the charger is removable from the main body and its ports can then be accessed by the user.

In a further alternative embodiment, the weight cavity receives a portable Bluetooth speaker therein, providing a handy way to transport and protect the speaker at the same time. In another alternative embodiment, a kit comprises the main body and the portable Bluetooth speaker and also the weight. When the user takes the portable speaker out of the main body to use it, the user replaces the weight in the weight cavity so that the cord organizer can resist forces that may work to slide it from wherever the user places it.

In one embodiment shown above in FIGS. 19A-19F, a knick-knack box magnetically attaches to the attachment of FIGS. 13A-13F. It could equally well attach to the attachment of FIGS. 14A-14F. In another embodiment, the box forms an integral unit with the attachment of FIGS. 13A-13F or FIGS. 14A-14F. In another embodiment, the box is replaced with a pen holder, a bowl, a receptacle for wireless earbuds and/or wireless earbud charging cases, a business card holder, a holder that accommodates a smart watch charging cable while supporting the smart watch itself.

In one further alternative embodiment, the weight is replaced with a device that provides wireless connectivity and controls lights embedded in the elastomeric material such as LED lights.

In an embodiment not shown, the weight and weight cavity are both omitted and the cord organizer is made larger so as to have enough mass to resist being pulled to the ground by the cords. The downside of such an embodiment is that it provides a larger object to carry around, making it somewhat less attractive to put into a pocket or handbag.

In most of the embodiments, the cable channel passage is illustrated as a perfectly straight slit. In alternative embodiments, to help the cable channel retain a cord, the straight slit is replaced with a flap that has a jagged shape like teeth or is shaped like an arrow or has scallops. In yet another alternative embodiment, the main body extension 561 overlaps the arm extension 562 as one flap overlaps another.

The cord organizers described above have a number of features in common. Not only do they hold cords in place on a horizontal surface without resorting to adhesives, they also help a user stand up their mobile device and give the user an easy way to wrap up their mobile device cords around the organizer for tidy transport. That said, it is possible for many embodiments to exist without having every one of these benefits. The appended claims should be consulted to see whether a given device falls within the scope and spirit of the invention. Other features and other functions will occur to those familiar with this field and such variations are to be expected to follow in the light of the complete and detailed examples provided above. Such variations need not, however, be considered beyond the reach of the appended claims.

What is claimed is:
1. An apparatus, comprising:
   a main body having dimensions, the dimensions of the main body comprising a main body length along a first axis, a main body width along a second axis perpendicular to the first axis, and a main body height along a third axis perpendicular to the first axis and to the second axis;
   the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body further comprising a first end channel communicating along a first end channel direction between the first pair of the sides or between the second pair of the sides;

the first end channel having a first end channel passage that communicates from an interior of the first end channel to outside of the main body at the main body left side;

the first end channel passage having a first cutaway that widens the first end channel passage at the main body left side;

a second end channel having a second end channel passage that communicates between the second end channel and the main body right side; and the second end channel passage having a second cutaway that widens the second end channel passage at the main body right side.

2. The apparatus as in claim 1, further comprising:

the first end channel having a first end channel cross-sectional area, where the interior of the first end channel is crossed, normal to the first end channel direction, by one of the first plane, the second plane, and the third plane;

the main body having a first cable channel communicating between the first pair of the sides;

the first cable channel having a first cable channel cross-sectional area where the second plane crosses the first cable channel;

the first cable channel having a first cable channel passage that communicates between the first cable channel and one of the second pair of the sides; and the first end channel cross-sectional area exceeds the first cable channel cross-sectional area.

3. An apparatus, comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body further comprising a first end channel communicating along a first end channel direction between the first pair of the sides or between the second pair of the sides;

the first end channel having a first end channel passage that communicates from an interior of the first end channel to outside of the main body;

the first end channel passage having a first cutaway that widens the first end channel passage at one of the sides; and a weight cavity in the main body.

4. An apparatus, comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body further comprising a first end channel communicating along a first end channel direction between the first pair of the sides or between the second pair of the sides;

the first end channel having a first end channel passage that communicates from an interior of the first end channel to outside of the main body;

a weight cavity in the main body;

a weight in the weight cavity;

the main body comprising flexible material having a first density;

the weight comprising inflexible material having a second density; and the second density being greater than the first density.

5. An apparatus, comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body further comprising a first end channel communicating along a first end channel direction between the first pair of the sides or between the second pair of the sides;

the first end channel having a first end channel passage that communicates from an interior of the first end channel to outside of the main body;

a weight cavity in the main body; and a magnet in the weight cavity.

6. An apparatus, comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body further comprising a first end channel communicating along a first end channel direction between the first pair of the sides or between the second pair of the sides;

the first end channel having a first end channel passage that communicates from an interior of the first end channel to outside of the main body;

a weight cavity in the main body; and a portable Bluetooth speaker in the weight cavity.

7. An apparatus, comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body further comprising a first end channel communicating along a first end channel direction between the first pair of the sides or between the second pair of the sides;

the first end channel having a first end channel passage that communicates from an interior of the first end channel to outside of the main body;

a weight cavity in the main body; and a mobile device charger, containing one or more batteries, in the weight cavity.

8. An apparatus, comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body further comprising a first end channel communicating along a first end channel direction between the first pair of the sides or between the second pair of the sides;

the first end channel having a first end channel passage that communicates from an interior of the first end channel to outside of the main body;

the first end channel having a first end channel cross-sectional area, where the interior of the first end channel is crossed, normal to the first end channel direction, by one of the first plane, the second plane, and the third plane;

the main body having a first cable channel communicating between the first pair of the sides;

the first cable channel having a first cable channel cross-sectional area where the second plane crosses the first cable channel;

the first cable channel having a first cable channel passage that communicates between the first cable channel and one of the second pair of the sides;

the first end channel cross-sectional area exceeds the first cable channel cross-sectional area; and the first cable channel having a first cutaway that widens the first cable channel passage at the one of the second pair of the sides.

9. The apparatus as in claim 8, further comprising the first cable channel having a second cutaway that widens the first cable channel passage at an other one of the second pair of the sides.

10. The apparatus as in claim 2, further comprising:

the first end channel passage communicating between the first end channel and the main body left side;

a second end channel having a second end channel passage that communicates between the second end channel and the main body right side; and the first end channel and the second end channel communicating between the main body top side and the main body bottom side.

11. An apparatus, comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body further comprising a first end channel communicating through the main body along a first end channel direction that is parallel to the third axis;

the first end channel having a first end channel passage that communicates from an interior of the first end channel to outside of the main body at the main body left side;

the first end channel having a first end channel cross-sectional area, where the interior of the first end channel is crossed by the first plane;

the main body having a first cable channel communicating in a first cable channel direction parallel to the second axis;

the first cable channel having a first cable channel cross-sectional area where the second plane crosses the first cable channel;

the first cable channel having a first cable channel passage that communicates between the first cable channel and the main body top side;

the first end channel cross-sectional area exceeding the first cable channel cross-sectional area;

the main body further comprising a second end channel communicating through the main body along a second end channel direction parallel to the first end channel direction;

the second end channel having a second end channel passage that communicates from an interior of the second end channel to outside of the main body at the main body right side;

the main body further comprising a second cable channel communicating in a second cable channel direction parallel to the first cable channel direction;

the second cable channel having a second cable channel passage that communicates between the second cable channel and the main body top side;

the main body further comprising a third cable channel communicating in a third cable channel direction parallel to the first cable channel direction; and the third cable channel having a third cable channel passage that communicates between the third cable channel and the main body top side.

12. An apparatus, comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body further comprising a first end channel communicating through the main body along a first end channel direction that is parallel to the third axis;

the first end channel having a first end channel passage that communicates from an interior of the first end channel to outside of the main body at the main body left side;

the first end channel having a first end channel cross-sectional area, where the interior of the first end channel is crossed by the first plane;

the main body having a first cable channel communicating in a first cable channel direction parallel to the second axis;
the first cable channel having a first cable channel cross-sectional area where the second plane crosses the first cable channel;
the first cable channel having a first cable channel passage that communicates between the first cable channel and the main body top side;
the first end channel cross-sectional area exceeding the first cable channel cross-sectional area;
the main body further comprising a second end channel communicating through the main body along a second end channel direction parallel to the first end channel direction;
the second end channel having a second end channel passage that communicates from an interior of the second end channel to outside of the main body at the main body right side; and
the main body further comprising a recess in the main body bottom side.

13. An apparatus, comprising:
a main body having dimensions, the dimensions of the main body comprising a main body length along a first axis, a main body width along a second axis perpendicular to the first axis, and a main body height along a third axis perpendicular to the first axis and to the second axis;
the first axis and the second axis defining a first plane, the first axis and the third axis defining a second plane, and the second axis and the third axis defining a third plane;
the first axis, the second axis, and the third axis intersecting at a common reference point of the main body and defining axes of the main body;
the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;
the first pair of the sides, the second pair of the sides, and the third pair of the sides defining the sides of the main body;
the main body further comprising a first end channel communicating along a first end channel direction between the first pair of the sides or between the second pair of the sides;
the first end channel having a first end channel passage that communicates from an interior of the first end channel to outside of the main body;
the first end channel having a first end channel cross-sectional area, where the interior of the first end channel is crossed, normal to the first end channel direction, by one of the first plane, the second plane, and the third plane;
the main body having a first cable channel communicating between the first pair of the sides;
the first cable channel having a first cable channel cross-sectional area where the second plane crosses the first cable channel;
the first cable channel having a first cable channel passage that communicates between the first cable channel and one of the second pair of the sides;
the first end channel cross-sectional area exceeds the first cable channel cross-sectional area;
the main body having a core surrounding the common reference point;
the main body having a first torso extending from the core toward one of the third pair of the sides, a first torso height of the first torso, in a direction parallel to the third axis, being less than the main body height;
the first torso having extending therefrom a first shoulder from which a first arm extends toward the one of the third pair of the sides;
the first arm having a first grip extending therefrom, parallel to the third plane, the first grip being spaced from the first torso by the first end channel;
the main body further comprising a first main body extension extending from the main body toward the first arm and being spaced from the first torso and the first arm; and
the first arm further comprising a first arm extension extending from the first arm toward the main body first extension and being spaced from the first torso and the main body.

14. The apparatus as in claim 13, further comprising the first grip being thickened at its distal end.

15. The apparatus as in claim 13, further comprising:
the core having an upper surface, at the main body top side, parallel to the first plane, from which the first main body extension extends from the main body toward the first arm extension;
the first arm having a first upper arm surface, at the main body top side, in a first upper arm surface plane; and
the first upper arm surface plane being angled upward with respect to the first plane.

16. The apparatus as in claim 13, further comprising:
the first end channel communicating between the first pair of the sides;
the first end channel passage communicating through the main body left side;
the main body further having a second end channel communicating between the first pair of the sides; and
the second end channel having a second end channel passage that communicates from the interior of the second end channel to outside of the main body through the main body right side.

17. The apparatus as in claim 16, further comprising:
the first cable channel passage communicating between the first cable channel and the main body top side;
the main body further having a second cable channel communicating between the first pair of the sides;
the second cable channel having a second cable channel cross-sectional area where the second plane crosses the second cable channel;
the second cable channel having a second cable channel passage that communicates between the second cable channel and the main body bottom side; and
the second cable channel cross-sectional area matching the first cable channel cross-sectional area.

18. The apparatus as in claim 17, further comprising:
the first torso having extending therefrom a second shoulder from which a second arm extends toward the one of the third pair of the sides;
the second arm having a second grip extending therefrom, parallel to the third plane and spaced from the first torso by the first end channel;

the main body further comprising a second main body extension extending from the main body toward the second arm and being spaced from the first torso and the second arm; and the second arm further comprising a second arm extension extending from the second arm toward the main body second extension and being spaced from the first torso and the main body.

19. The apparatus as in claim 18, further comprising the first grip and the second grip having cutaways that widen the first end channel passage at each of the first pair of the sides.

20. The apparatus as in claim 18, further comprising:
the core having an upper surface, at the main body top side, parallel to the first plane;
the core having a lower surface, at the main body bottom side, parallel to the first plane;
the first arm having a first upper arm surface, at the main body top side, in a first upper arm surface plane;
the second arm having a second lower arm surface, at the main body bottom side, in a second lower arm surface plane;
the first upper arm surface plane being angled upward with respect to the first plane; and
the second lower arm surface plane being angled downward with respect to the first plane.

21. The apparatus as in claim 18, further comprising:
the first grip extending from the first arm toward the main body bottom side; and
the second grip extending from the second arm toward the main body top side.

22. The apparatus as in claim 21, further comprising the first grip and the second grip extending toward each other in a common plane parallel to the third plane.

23. The apparatus as in claim 18, further comprising the first end channel passage communicating through the main body left side between the first grip and the second grip.

24. The apparatus as in claim 23, further comprising:
the first cable channel having a first proximal cable channel wall adjacent the core;
the first cable channel having a first inner cable channel wall adjacent the first torso;
the first cable channel having a first distal cable channel wall adjacent the first arm;
the first end channel having a first upper end channel wall adjacent the first arm;
the first end channel having a first lower end channel wall adjacent the second arm;
the first end channel having a first proximal end channel wall adjacent the first torso; and
the first upper end channel wall being closer to the main body top side than the first inner cable channel wall.

25. The apparatus as in claim 24, further comprising:
the first grip having a first distal end away from where the first grip extends from the first arm;
the second grip having a second distal end away from where the second grip extends from the second arm;
the first distal end of the first grip being thickened toward the first proximal end channel wall; and
the second distal end of the second grip being thickened toward the first proximal end channel wall.

26. The apparatus as in claim 25, further comprising the first distal end and the second distal end flaring out from each other, within the first end channel passage, to form a notch.

* * * * *